(12) United States Patent
Gupta

(10) Patent No.: US 6,278,714 B1
(45) Date of Patent: Aug. 21, 2001

(54) EFFICIENT HARDWARE IMPLEMENTATION OF VIRTUAL CIRCUIT BUNCHING

(75) Inventor: Amit Gupta, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/019,799

(22) Filed: Feb. 6, 1998

(51) Int. Cl.$^7$ .................................................. H04L 12/28
(52) U.S. Cl. ............................................................ 370/422
(58) Field of Search ................................... 370/422, 397, 370/486, 401, 471, 395, 393, 396, 394, 389, 399, 392, 351, 220, 221, 390, 423, 413, 231, 232–234

(56) References Cited

U.S. PATENT DOCUMENTS

| 5,530,806 | * | 6/1996 | Condon et al. | 370/397 |
| 5,627,836 | * | 5/1997 | Conoscenti et al. | 370/397 |
| 5,872,783 | * | 2/1999 | Chin | 370/392 |
| 5,936,959 | * | 8/1999 | Joffe | 370/397 |
| 5,951,649 | * | 9/1999 | Dobbins et al. | 370/351 |
| 6,069,895 | * | 5/2000 | Ayandeh | 370/399 |

* cited by examiner

Primary Examiner—Wellington Chin
Assistant Examiner—Prenell Jones
(74) Attorney, Agent, or Firm—McDermott, Will & Emery

(57) ABSTRACT

The invention is directed to a flexible method of allocating groups of virtual circuits in a network as a virtual circuit bunch. A virtual circuit bunch of arbitrary number can be set up with the ease and table entries needed for setting up only a single virtual circuit. A single virtual circuit bunch can have plural destinations. Further, a virtual circuit bunch can be routed to the same destination over different routes. Connections across the network can be initiated as separate virtual circuits and then be grouped together as a virtual circuit bunch. The implementation of virtual circuit bunches permits rapid setup of virtual circuits and reduced table sizes at individual nodes of the network. A fast connect service can be implemented using virtual circuit bunches without establishing a connection by assigning a fast connect packet to one virtual circuit of a virtual circuit bunch. Virtual circuit bunches permit cell interleaving problems found in ATM switches to be circumvented in a particularly convenient way.

20 Claims, 27 Drawing Sheets

| PORT(VCI) | VCB | NEXT NODE VCB 3 | DESTINATION NODE |
|---|---|---|---|
| 1 | VCB 3A | SWITCH 2 | SWITCH 4 |
| 2 | | | |
| 3 | | | |
| 4 | | | |
| 5 | | | |
| 6 | | | |
| 7 | | | |
| 8 | VCB 3A | | SWITCH 4 |
| 9 | VCB 3B | | SWITCH 5 |
| 10 | | | |
| 11 | | | |
| 12 | | | |
| 13 | | | |
| 14 | | | |
| 15 | | | |
| 16 | VCB 3B | | SWITCH 5 |
| 17 | VCB 3C | | SWITCH 3 |
| 18 | | | |
| 19 | | | |
| 20 | | | |
| 21 | | | |
| 22 | | | |
| 23 | | | |
| 24 | VCB 3C | SWITCH 2 | SWITCH 3 |

FIG. 8A

| | PORT(VCI) | VCB | NEXT NODE VCB 3 | DESTINATION NODE |
|---|---|---|---|---|
| 1 | 3(102) | VCB 3A | SWITCH 2 | SWITCH 4 |
| 2 | 3(103) | | | |
| 3 | 3(104) | | | |
| 4 | 3(105) | | | |
| 5 | 3(106) | | | |
| 6 | 3(107) | | | |
| 7 | 3(108) | | | |
| 8 | 3(109) | VCB 3A | | SWITCH 4 |
| 9 | 5(112) | VCB 3B | | SWITCH 5 |
| 10 | 5(113) | | | |
| 11 | 5(114) | | | |
| 12 | 5(115) | | | |
| 13 | 5(116) | | | |
| 14 | 5(117) | | | |
| 15 | 5(118) | | | |
| 16 | 5(119) | VCB 3B | | SWITCH 5 |
| 17 | 2(128) | VCB 3C | | SWITCH 3 |
| 18 | 2(129) | | | |
| 19 | 2(130) | | | |
| 20 | 2(131) | | | |
| 21 | 2(132) | | | |
| 22 | 6(133) | | | |
| 23 | 6(134) | | | |
| 24 | 6(135) | VCB 3C | SWITCH 2 | SWITCH 3 |

FIG. 8B

| PORT(VCI) | VCB | NEXT NODE | DESTINATION NODE |
|---|---|---|---|
| 3(102-109) | 3A | SWITCH 2 | SWITCH 4 |
| 5(112-119) | 3B | SWITCH 2 | SWITCH 5 |
| 2(129-136) | 3C | SWITCH 2 | SWITCH 3 |

FIG. 8C

| LEVEL 1 | LEVEL 2 | <PORT, VCI> |
|---|---|---|
| VCB 3 | | |
| | VCB 3A | PORT 5, 103-110; DESTINATION A |
| | VCB 3B | PORT 5, 112-114<br>PORT 6, 101-105; DESTINATION B |
| | VCB 3C | PORT 6, 107-115; DESTINATION C |

| 1400 | FORWARD TABLE: 1430 | 1440 | 1450 |
|---|---|---|---|
| | INPUT <PORT,VCI> | VCB | OUTPUT |
| | 3 (102-106, 111-113) | VCB 3A | ANY UNUSED |
| | 5 (103,107,109, 112-116) | VCB 3B | ANY UNUSED |

| 1420 | REVERSE TABLE: 1460 | 1470 | 1480 |
|---|---|---|---|
| | OUTPUT <PORT,VCI> | DESTINATION ADDRESS | VCB |
| | 3(102) | DESTINATION ADDRESS | VCB 3 |
| | 3(103) | | |
| | 3(104) | | |
| | 3(105) | | |
| | 3(106) | | |
| | 3(111) | | |
| | 3(112) | | |
| | 3(113) | | |
| | 5(103) | | |
| | 5(107) | | |
| | 5(109) | | |
| | 5(112) | | |
| | 5(113) | | |
| | . | | |
| | . | | |
| | 6(110) | ↓ | ↓ |

FIG. 14

EFFICIENT HARDWARE IMPLEMENTATION OF VIRTUAL CIRCUIT BUNCHING

CROSS REFERENCE TO RELATED APPLICATIONS

This application is related to U.S. application Ser. No. 08/868,972 which is hereby incorporated by reference in its entirety.

BACKGROUND OF THE INVENTION

1. Field of the Invention

The invention relates to communication systems and, more particularly to the creation, maintenance, use and deletion of virtual channels in a network environment.

2. Description of Related Art

Modern data networks trace their historical origins to telephone switching networks. Telephone switching networks set up connections between an originating caller and a called subscriber selected by dialing the called subscriber's telephone number.

Digital networks are known which permit information packets to be routed from a source to a destination without the necessity for a hardwired connection between the calling subscriber and the destination subscriber. Packets are routed over links between nodes of a network. Rather than a physical connection, a virtual connection, sometimes called a virtual channel or virtual circuit is defined between the source of the packet and its destination. A virtual circuit gives the appearance of maintaining a hardwire connection, but utilizes the resources of the connection only when data need to be sent. This permits the link to be shared by other virtual circuits and improves the efficiency and throughput of the links of the network.

One form of modern high speed network uses a set of standards collectively termed asynchronous transfer mode (ATM). The basic data element used by these networks is a cell, which is a sequence of 53 bytes of which the first 5 are the header and the other 48 are the cell payload. To allow very high data rates (in the hundreds of megabytes per second and above) the switching time of a cell in every switch or node along the route through the network must be minimal. ATM networks achieve this by way of a virtual channel mechanism which requires a set-up phase before the actual data stream can be transported from source to destination. The notion of a virtual path is defined in the ATM standard. Each virtual path "contains" $2^{16}$ (65,536) virtual circuits. Supporting virtual path requires significant additions to the ATM switch hardware. Consequently, many switches only support virtual circuits; they do not support virtual paths.

The Problems

It would be desirable to have an efficient mechanism for quickly allocating multiple connections. Further, it would be desirable to reduce the table size required for network switches to support large numbers of virtual circuits. It would further be desirable to implement multiple virtual channels set-up while maintaining compatibility with current switches but nevertheless supporting heterogeneity in switches in a network. It would further be desirable to be able to route multiple virtual circuits over different paths. It would also be desirable to support dynamic aggregation of individual virtual circuits into larger entities. It would also be desired to permit enhanced resource sharing across connections of a network. It would further be desirable to have techniques for handling ATM cell interleaving problems in a multi-sender multi-cast. It would also be desirable to have efficient support for fast connection establishment. It would further be desirable to improve the efficiency with which "keep-alive" and "refresh" packets are sent through the network.

SUMMARY OF THE INVENTION

The problems of the prior art are solved in accordance with the invention by providing a new entity for use in networks called the Virtual Circuit Bunch (VCB). Virtual Circuit Bunches can be utilized to set-up and manage together groups of virtual circuits in a flexible way which results in increased performance as well as overcoming the problems of the prior art.

The Virtual Circuit Bunch, as set forth herein, enables groups of Virtual Circuits to be established between one or more points of origin and one or more destinations. In one form Virtual Circuit Bunches can be implemented without any changes to switch hardware and permit great flexibility in Virtual Circuit allocation. In another form, changes resulting in an improved Forwarding and Translation Table result in improved management of Virtual Circuit Bunches by permitting a VCB to be managed with a single table entry. This form is preferably implemented in hardware.

One aspect of the invention is directed to a switching node which includes a switching matrix, and a controller to control the switching matrix, in which the controller is configured to set up an entry group of virtual circuits as a virtual circuit bunch, using a single table entry.

Another aspect of the invention is directed to a method of allocating virtual circuits, by establishing a plurality of virtual circuits from one node to at least one other node as a virtual circuit bunch in response to a single request.

Another aspect of the invention relates to a method of identifying virtual circuits at a node going to a common destination node; and aggregating those virtual circuits into a virtual circuit bunch.

Another aspect of the invention relates to a method of providing a fast connect service in a digital switching network by appropriately assigning a packet to a virtual circuit of a virtual circuit bunch without establishing a connection.

Another aspect of the invention relates to a method of allocating virtual circuits in a switching system allocating a virtual circuit to all nodes participating in a multicast using a virtual circuit bunch.

Another aspect of the invention relates to a system for the transmission of digital communications, including a plurality of user communication devices; a plurality of at least partially interconnected switching nodes, each node serviced by a node controller servicing said user communications devices; in which at least one of said node controllers is configured to set up a group of virtual circuits to respective one or more destinations as a virtual circuit bunch.

Other aspects of the invention are directed to computer program products for carrying out the invention.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the present invention will be apparent from the following description, in which:

FIG. 8A is a table summarizing the VCB request of FIG. 7C.

FIG. 8B shows the same table as FIG. 8A but with the incoming ports of the VCB assigned to carry traffic.

FIG. 8C is a table showing a reduced number of entries needed to manage the same virtual circuit bunches shown in FIG. 8B in accordance with one aspect of the invention.

FIG. 13 is an exemplary table storing VCB information.

FIG. 14 shows exemplary tables storing connection information relating to a VCB used at a node at either end of a VCB.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENTS

Figure 1:
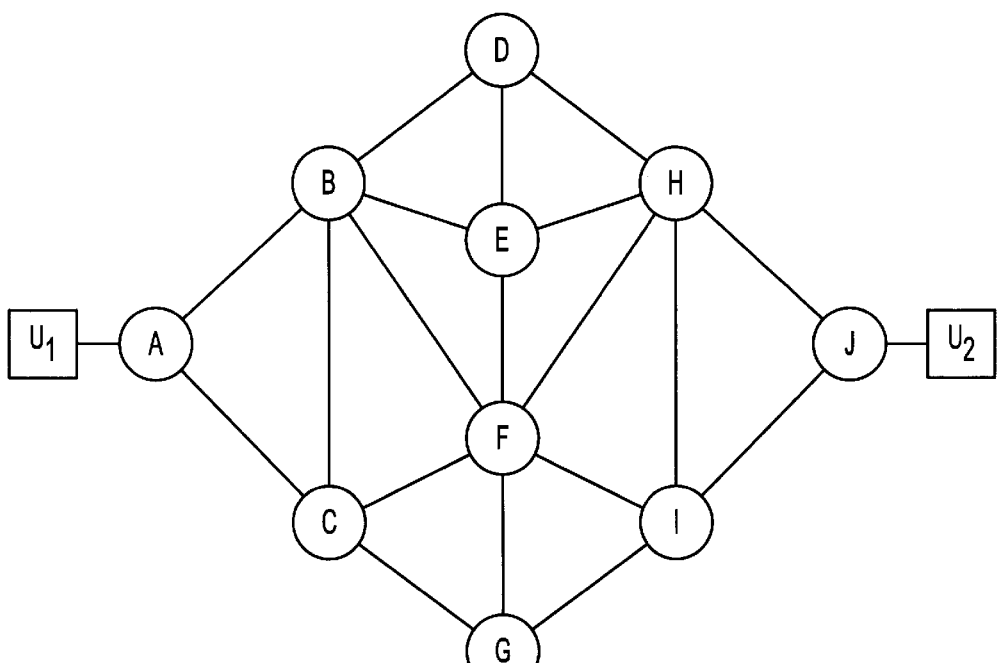
FIG. 1 has a block diagram showing an exemplary network used for carrying out the invention.

FIG. 1 is a block diagram showing an exemplary network useful in carrying out the invention. The network shown is comprised of nodes A through J, each node being capable of routing digital data from users connected to the node or from other nodes connected to the node through to a destination. For example, when user U1, which is connected to node A, desires to connect to user U2, connected to node J, the user will request a connection from node A to node J as discussed more hereinafter. In one implementation, node A will do a calculation of a proposed route through the network from user U1 to user U2. In the example shown, node A proposes a route from user 1 through node A, to node C, to node F, to node H, to node J, to user U2. Different types of networks have different types of routing mechanisms. In the example shown in FIG. 1, the invention will be described with reference to an ATM network where each of the nodes constitutes an ATM switch. The principles of the invention, however, are applicable to general networks without restriction to the type of switching technology.

Figure 2:
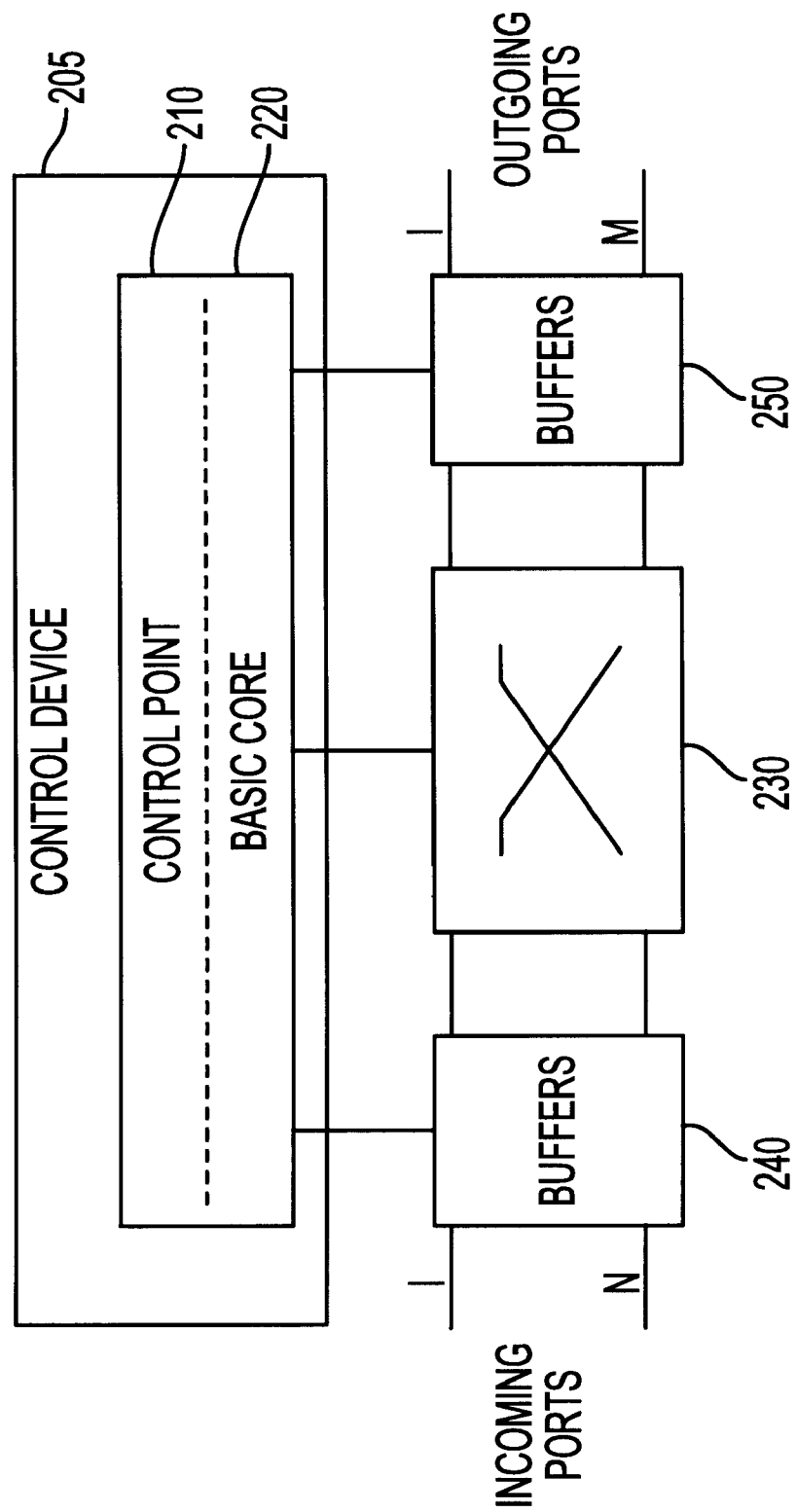
FIG. 2 is a block diagram of an exemplary node of the network shown in FIG. 1.

FIG. 2 is a block diagram of an exemplary node of the network shown in FIG. 1. Digital data arrives on incoming ports 1 through N over digital links connected to users and other nodes. The incoming digital data is optionally buffered in buffers 240 prior to being routed to the appropriate outgoing port of the set of outgoing ports 1–M. The outgoing ports connect to either end-users or other nodes as desired to implement a particular network topology. One or more interconnect switches 230 forming part of a switching fabric are activated to connect the appropriate incoming port to the appropriate outgoing port so that data is routed from the source toward the destination in an orderly fashion. Data having passed through the switching fabric 230 is optionally applied to outgoing buffers 250 prior to being applied to respective links connected to the outgoing ports. A control device or controller 200.

At a high level, ATM networks can be viewed as a collection of ATM-switches interconnected by high-speed links to provide ATM service to a number of external users. A typical switch is comprised of three main parts: the switching fabric, a buffering unit, and a control unit. The control unit is divided into two parts. The first part controls the cell switching properties, i.e., controls and coordinates the operation of the buffering unit and the switching fabric; for performance reasons it is typically implemented in hardware such as lookup tables, finite state machines, etc. The second part is responsible for all other control functions such as preparing and maintaining the switching tables, coordinating activities with other switches and with network managements facilities, and servicing the individual user requests. This is referred to as the control point (CP) of the switch. As used herein the switch contains the fabric, the buffering units, and the basic core of the control unit, whereas the switch and the CP together will be referred to as a node. The CP is essentially a logical entity which is typically implemented in software although firmware and other software/hardware configuration are also possible.

The device on which the CP is implemented is termed the Controlling Device (CD) or controller. The CD may not be a single entity, that is, parts of the CP can be implemented in different hardware pieces. For example, it would be quite common for a CP to be split into two portions the first of which is implemented within the switch and the second in another closely attached device. Another typical split of the CP functions into multiple physical CDs is in cases were each link adaptor contains a separate micro-controller and another optional central processor is responsible for the common switch functions. Another implementation option is a single CD that hosts several CPs, each controlling a different switch and possibly communicate with each other within the same CD. A configuration in which a single CP controls several switches is also possible. For example, if the particular way in which a switch is implemented lends itself to the efficient interconnection of several switches (typically of the same kind) then it would be natural to have this set of switches controlled by a single CP.

Two CPs are called neighbors if they control two switches that are directly connected by a link.

A CP is a uniquely identifiable entity within the network. That is, it is possible to name a CP as the endpoint of a VC and switches can identify cells destined to the CP and forward them appropriately (this is one mechanism by which control messages can be exchanged between CPs.

Every switch in the network possesses a unique ID, which is assigned to it at configuration time. This ID, termed switch ID, is guaranteed to be unique only within the network. Links can have IDs that are local to the switch from which they emanate. This allows to keep the local link IDs (which are frequently used) short. Therefore, to globally identify a link some combination of a CP ID, node ID and link ID must be used. Link, switch and CP IDs appear in the messages that are exchanged between CPs and hence it is desirable to choose as short a descriptor as possible.

In general, CPs perform those functions that are necessary to make a group of switches operate as an integrated network. The process of integration entails understanding of and compensation for the differences between switches of different makes and models. One of the most important functions is that of virtual circuit (connection) management which includes VC setup, maintenance and VC take down.

To perform their functions, CPs obviously need to communicate with one another either directly or indirectly. The control mechanism typically requires CPs to mostly communicate with neighbor CPs. In many cases a message arriving at a CP may trigger the transmission of another message. For example, if a topological change has occurred, a CP will typically notify other CPs of the change; each of the recipients of this message may, in turn, generate new messages to further distribute the information. A control link is the channel over which two CPs communicate. The collection of control of control links must enable every CP to distribute the appropriate data to every other CP. In a typical design, there will be a control link between any two neighboring CPs.

Figure 3A:
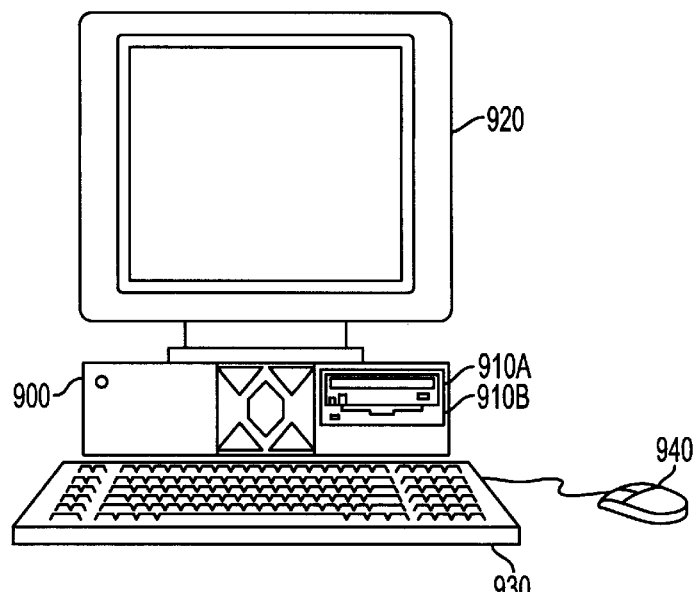
FIG. 3A is a front view of a computer suitable for use as a control device or controller for one or more network nodes.

FIG. 3A is a front view of a computer suitable for use as a control device or controller for one or more network nodes. Although the computer is illustrated as a standalone device, computers used as controllers are more typically printed circuit cards which are rack mounted and plug into a backplane. The controller 300 illustrated includes drives 310A and 310B for receiving, reading and writing information stored on removable storage media. The controller 300 also may optionally include a CD ROM device, not shown and an internal hard drive, also not shown. Display 320, keyboard 330 and mouse 340 may be optional in a particular environment although typically, these input output devices may be attached for troubleshooting a particular controller. The actual configuration of a controller may vary from switch to switch.

Figure 3B:
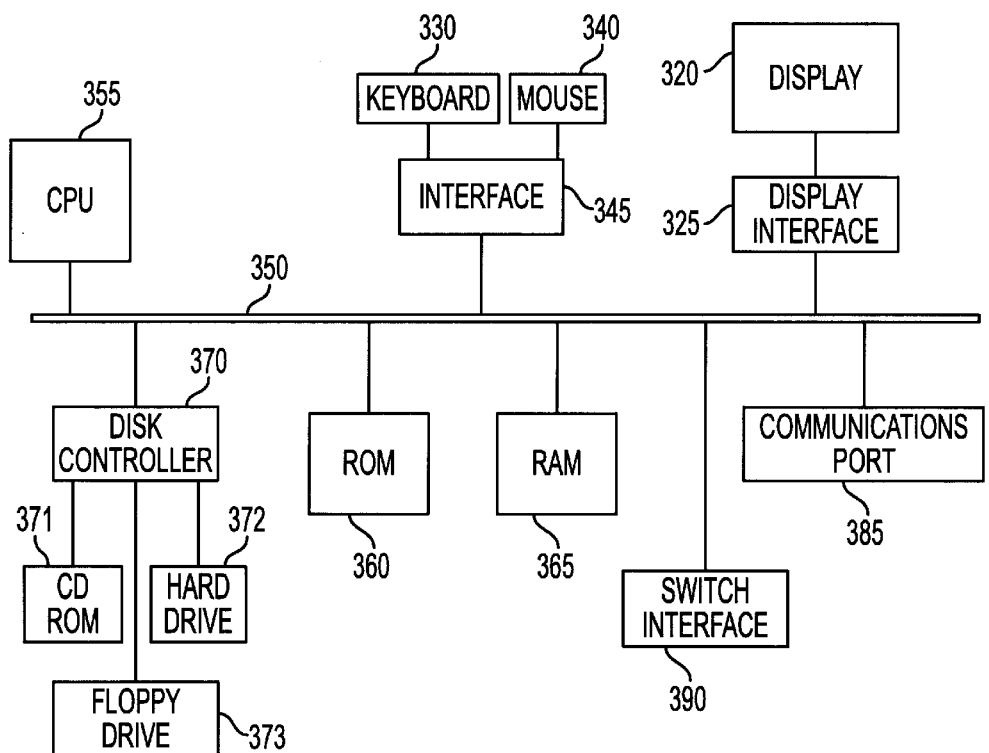
FIG. 3B is a block diagram showing an exemplary hardware architecture of the controller of FIG. 3A.

FIG. 3B is a block diagram showing an exemplary hardware architecture of the controller of FIG. 3A.

As shown in FIG. 3B, the controller has a CPU 355 which connects and controls bus 350. A disk controller 370 interfaces the floppy drives 373, internal hard drive 372 and CD ROM 371. The particular configuration for storage media may vary from controller to controller. Read Only Memory 360 and Random Access Memory 365 provide memory for storing programs and data information to carry out the controller functions. Interfaces 345 and 375 are available to permit input output devices such as keyboard 330, mouse 340 and display 320 to be connected when working with the controller for installation, setup, maintenance or the like. A communications port 385 permits external communications from the bus. Switch interface 190 provides the control and exchange of information between the switch controlled by the controller and the CPU 355 providing the control.

Figure 3C:
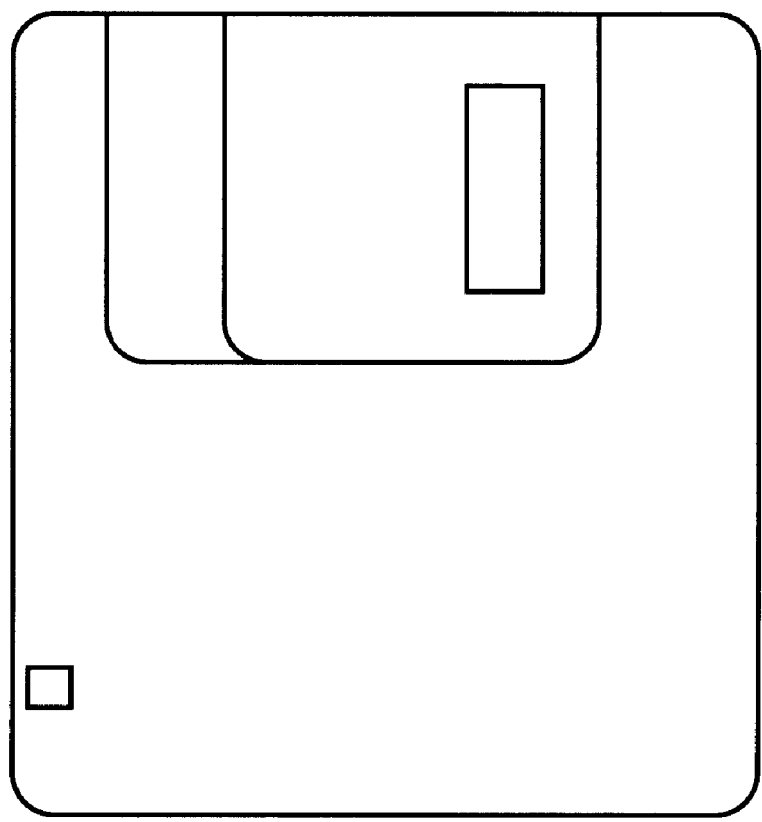
FIG. 3C is a view of an exemplary memory medium suitable for storing programs and data used in carrying out the invention.

FIG. 3C is a view of an exemplary memory medium suitable for storing programs and data use in carrying out the invention.

Figure 4:
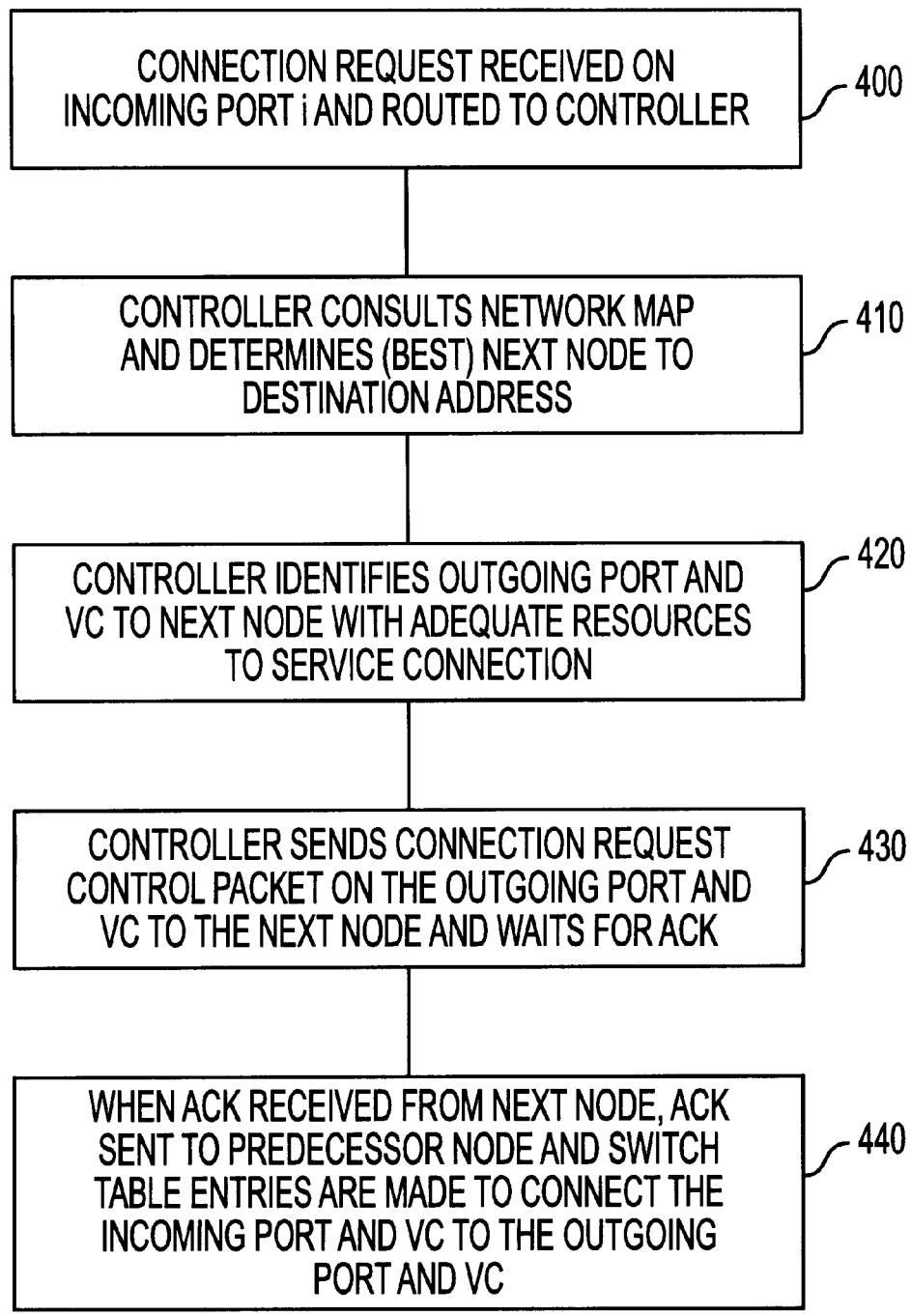
FIG. 4 is a flow chart of a process used at a node for setting up a virtual circuit from an originating station U1 to a destination station U2.

FIG. 4 is a flow chart of a process used at a node in setting up a virtual circuit from an originating station U1 to a destination station U2. This process describes a simple single VC connection between U1 and U2. When a connection request is received on an incoming port i, such as from a user or a predecessor node, it is routed to the controller as discussed previously (400). The controller consults a network map and determines the (best) next node for routing data from U1 toward its destination address (410). In some networks, the controller will only determine the best next node whereas in others, it will attempt to determine the entire route to the destination. The controller selects an outgoing port and VCI to the next node with adequate resources to service a level of service (LOS) specified for the connection (420). The controller sends a request control packet on the outgoing port and virtual circuit to the next node controller and waits for an acknowledgment (430). The controller may send this over a control link between the two switches or over the actual port and virtual circuit proposed for use in the connection. When an acknowledgment is received from the next node, the acknowledgment will be sent to predecessor node or to the user indicating acceptance of the connection and a willingness to provide the services at the requested LOS specified in the request. The node controller will make entries in a switch table specifying the port and VC to be utilized for the connection (440).

Figure 5:
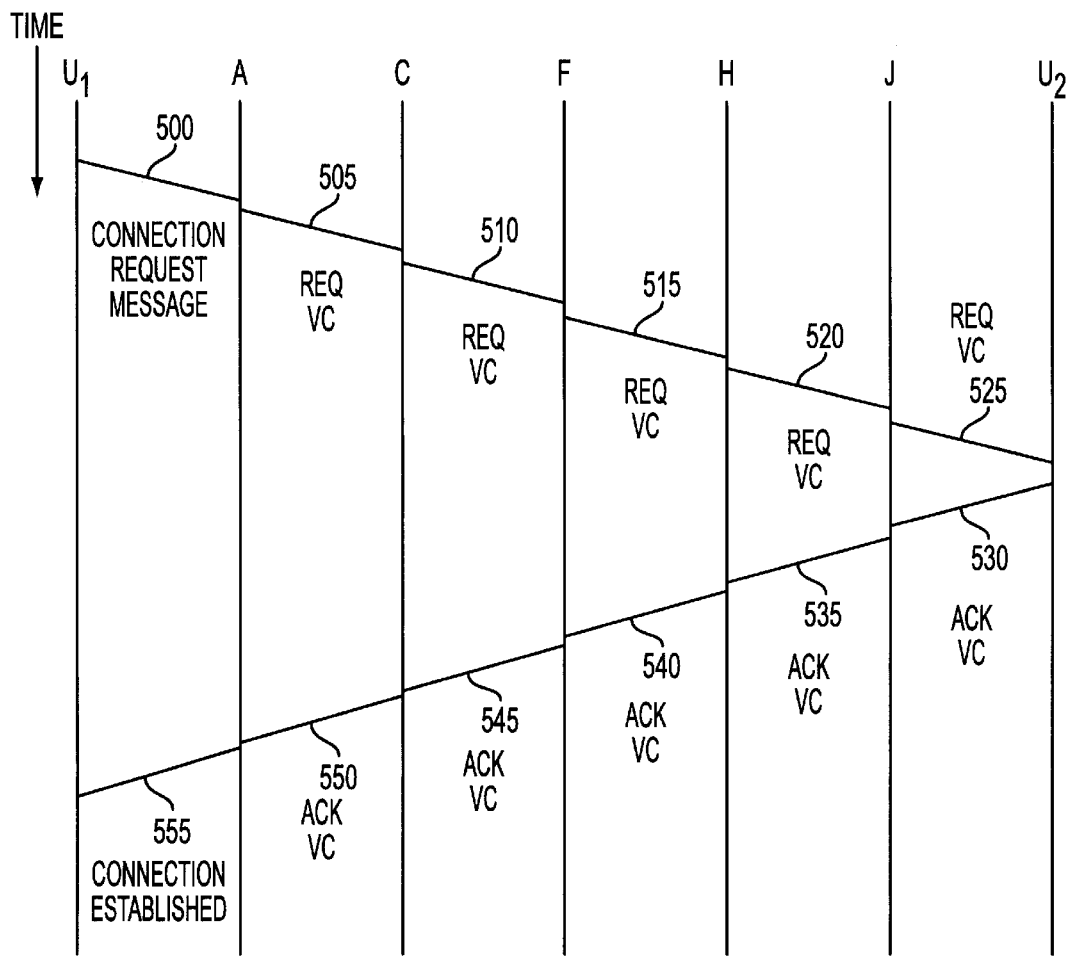
FIG. 5 is a time line diagram showing set-up of a virtual circuit between U1 and U2 over the network of FIG. 1.

FIG. 5 is a time line diagram showing set-up of a virtual circuit between U1 and U2 over the network of FIG. 1. User U1 initiates a connection request message to node A (500) which requests a virtual circuit to node C (505) which requests a virtual circuit to node F (510) which requests a VC to node H (515) which requests a VC to node J (520) which requests a VC to destination user U2 (525). Once the VC is dedicated to node U2, U2 will acknowledge the VC to node J (530) which will acknowledge the VC to node H (535) which will acknowledge the VC to node F (540) which will acknowledge the VC to node C (545) which will acknowledge the VC to node A (550) which will acknowledge the connection established (555) to the requesting user U1. Thus a cascading set of VC requests normally occurs followed by a cascading set of acknowledgments by which a virtual circuit is set up.

One should note that this requires significant processing at each of the nodes and significant network traffic in order to set up a single VC. If one is attempting to set up a thousand virtual circuits, individual handling of the virtual circuits creates a significant processing and network traffic load.

Figure 6:
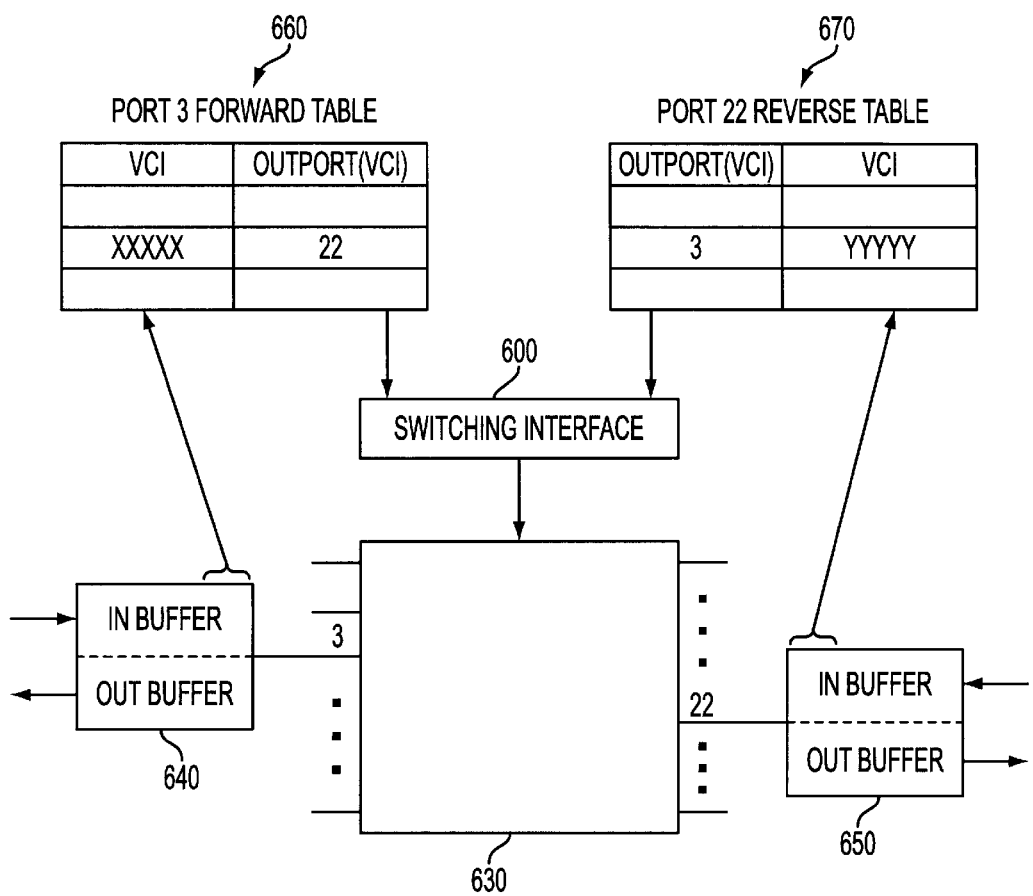
FIG. 6 is a block diagram showing operation of a network node when implemented as a ATM switch.

FIG. 6 is a block diagram showing an operation of a network node implemented as an ATM switch. In order to quickly switch an ATM cell arriving at an incoming buffer, such as 640 to an outgoing port, a set of switching tables is maintained. Each switching table has an (incoming) virtual circuit identifier (VCI) column and an associated output port (and VCI). Virtual Circuit Identifier's are sometimes called tags. In FIG. 6, the ports illustrated are bi-directional ports, that is, they accommodate incoming as well as outgoing traffic. When an incoming ATM cell is received in an in-buffer for port 3, the tag (XXXXX) is read and utilized to extract the output port destination for the tagged cell using the port 3 forward table 660. Port numbers passing to the switching interface 600 activate the switching fabric 630 to connect port 3 to port 22 during which time the contents of in-buffer 640 are passed to an out buffer 650 on port 22. In the reverse direction, the tag of an incoming cell stored in in-buffer 650 (YYYYY) is utilized to access the port 22 reverse table 670. The input port, 3 in this case, is passed to a switching interface 600 to set up a reverse direction connection between the port 22 in-buffer and port 3 out-buffer 640. The switch tables are set up for a very fast access and response. The contents of the switching tables a illustrated in Figure 6 are set by the controller from the controller tables as discussed more hereinafter. In this example, the bi-directional VC takes the same route in both directions. This does not need to be the case, but is for purpose of this example.

Figure 7A:
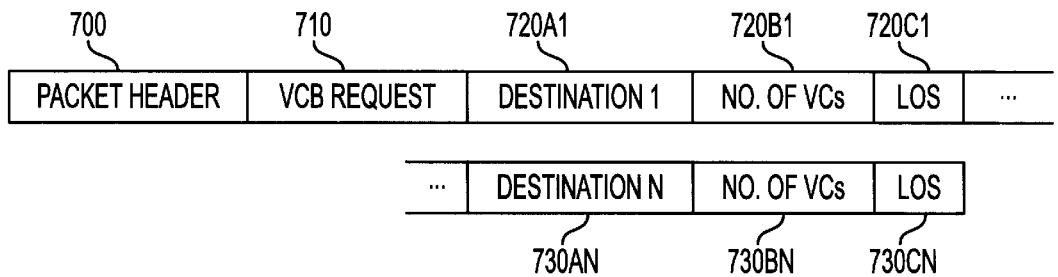
FIGS. 7A, 7B and 7C show exemplary packet formats used in requesting set-up of a Virtual Circuit Bunch (VCB).
Figure 7B:
Figure 7C:
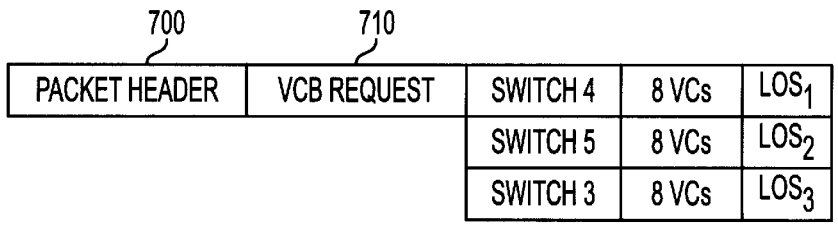

FIGS. 7A, 7B and 7C show exemplary packet formats used in requesting set up of a virtual circuit bunch (VCB). The generic format for such a request is shown in FIG. 7A. A packet header 700 begins a request with a packet type 710 indicating a VCB request. Following the VCB request are a set of ordered fields 720A1, 720B1 and 720C1 through 730AN, 730BN and 730CN. Each set of the ordered set of fields specifies a destination (720A), a number of VCs (720B) for a virtual circuit bunch or subset of virtual circuit bunch going to the destination specified in 720A, and a level of service (LOS) 720C. A single virtual circuit bunch request can be utilized to specify a plurality of destinations and the number of VCs associated with each destination can be arbitrarily specified.

FIG. 7B shows and example of a request for a virtual circuit request from switch 1 to switch 2 for 32 virtual circuits. This would be sent as a control packet from the switch 1 controller to the switch 2 controller.

In more complex example, one which will be pursued throughout the remainder of the explanation of the invention, is shown in FIG. 7C. Again a packet header 700 and a VCB request field 710 precede the fields specifying the virtual circuit bunch. In the example shown in FIG. 7C, switch 1 is requesting a virtual circuit bunch totaling 25 virtual circuits, 8 of which are destined for switch 4, 8 of which are destined for switch 5, and 8 of which are destined for switch 3. When the control packet illustrated in FIG. 7C is received at switch 2, switch 2 acts strictly as an intermediary to traffic going to switches 3, 4, and 5. This does not need to be the case, but is for purposes of this example. Switch 2 could easily be a destination for some of the virtual circuits. By this request, switch 1 sets up 24 bi-directional virtual circuits to switch 2. Switch 2 sets up 8 outgoing virtual circuits to switch 4, 8 to switch 5 and 8 to switch 3. In a reverse direction, the virtual circuits from switches 3, 4, and 5 are mapped to the 24 virtual circuits set up between switch 1 and switch 2. When the virtual circuit bunch is set up, no actual traffic is passed, rather the virtual circuits are defined together with their level of service and are available to pass traffic as it is routed to them from circuits originating or terminating at the end nodes of the virtual circuit bunch.

FIG. 8A is a table summarizing the VCB request of FIG. 7C. Considering columns 3 and 4 of FIG. 8A, a virtual circuit bunch of 24 virtual circuits is set up between switch 1 and switch 2. This virtual circuit bunch is labeled VCB 3 for reference. VCB 3 is a convenient alias for referring to groups of virtual circuits, in this case consisting of 25 virtual circuits between switch 1 and switch 2. At switch 2, portions of the virtual circuit bunch VCB 3 are directed to different locations. Specifically, 8 VCs are directed to switch 4, 8 are directed to switch 5, and 8 are directed to switch 3. These subsets of VCB 3 can be labeled, conveniently, VCB 3A, VCB 3B and VCB 3C. These labels are convenient aliases for the subset(s) of virtual circuits going respectively to destinations switch 4, switch 5, and switch 3, respectively.

FIG. 8B shows the same table as FIG. 8A except that exemplary port and VC assignments are shown.

FIG. 8C is a table showing a reduced number of entries needed to manage the same virtual circuit bunches shown in FIG. 8B in accordance with one aspect of the invention. The 24 virtual circuits shown in FIG. 8B would normally require one entry each in the forwarding and translation tables. However, using techniques described more in detail hereinafter, it is possible to reduce the number of entries to fewer table entries for each bunch along the lines shown in FIG. 8C.

Figure 9:
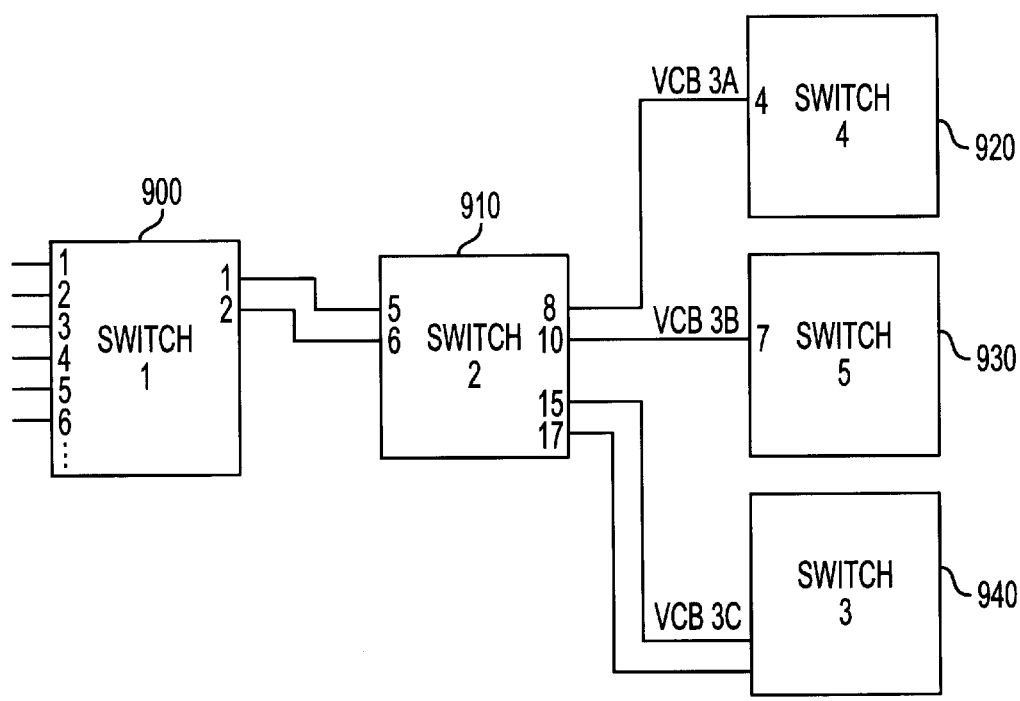
FIG. 9 is a block diagram showing the switches and links used for setting up the VCB requested in FIG. 7C.

FIG. 9 is a block diagram showing the switches and links used in setting up the VCB requested in FIG. 7C and described in conjunction with FIG. 8. VCB 3 is established between switch 1 and switch 2 with 24 virtual circuits. Those 24 virtual circuits are divided up into 3 subsets with subset VCB 3A going to switch 4, subset VCB 3B going to switch 5, and subset VCB 3C going to switch 3.

At this point in the example, the request of FIG. 7C has been granted and the virtual circuit bunch established as illustrated in FIG. 9. However, no traffic is flowing across the virtual circuit bunch. The virtual circuit bunches are allocated and set up in the controller tables and the switching tables of the switches but they are not being utilized.

Returning to FIG. 8B, column 1 of FIG. 8B shows an allocation of incoming ports and virtual circuits of switch 1 which correspond to the virtual circuit bunch VCB3 and its subsets VCB 3A and VCB 3B and VCB 3C. When a new user at switch 1 has traffic for a destination at switch 4, switch 1 will assign the user to a VC in VCB 3A which goes to switch 4. The assigned VC in VCB 3A will immediately route the traffic to switch 4 without any setup required for virtual circuits between switch 1 and switch 4. They have been preallocated. At switch 4, the destination address of a cell is used to route the cell to its final destination.

Figure 10:
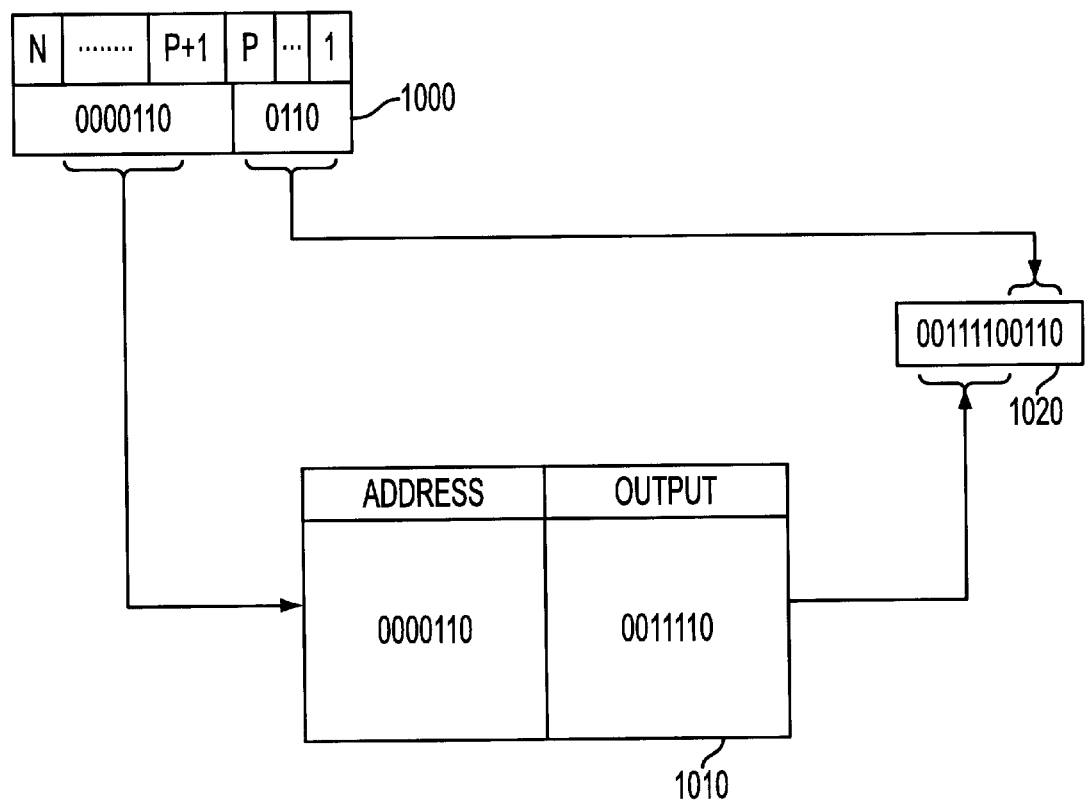
FIG. 10 is a block diagram of a relatively simple implementation of improvements in a Forwarding and Translation Table for managing Virtual Circuit Bunches in accordance with a first embodiment of the invention.

FIG. 10 is a block diagram of a first implementation of improvements in a Forwarding and Translation Table for managing Virtual Circuit Bunches in accordance with one embodiment of the invention. An incoming virtual circuit identifier is shown as a packet having N bits (item 1000). In the example as shown in FIG. 10, the virtual circuit address space is partitioned into two parts. The first part, comprising bits 1–P of the virtual circuit identifier are the least significant bits of the identifier. The second part comprising bits (P+1)–N or the most significant bits, are used as an entry address into a look up table 1010. The output of the lookup table is then utilized as the most significant bits N–(P+1) of the translated identifier. The remaining P bits of the incoming VCI are appended to the outgoing virtual circuit identifier 1020 without translation. Thus, a single table entry in the forwarding and translation table can service $2^P$ virtual circuits. As discussed more in conjunction with later figures, the number P utilized reflects the size of the virtual circuit bunch. The larger P is, the larger the number of virtual circuits that can be managed in a single entry ($2^P$) will be. For example, if P=0 then each table entry will handle $2^0$ or a single virtual circuit. If P=1, then each table entry will handle $2^1$ or 2 virtual circuits. If P=2, then each table entry will handle $2^2$ or 4 virtual circuits. If N–P=3, then each table entry will handle $2^3$ or 8 virtual circuits. In general, this number of virtual circuits in a virtual circuit bunch is $2^{(P)}$.

Figure 11:
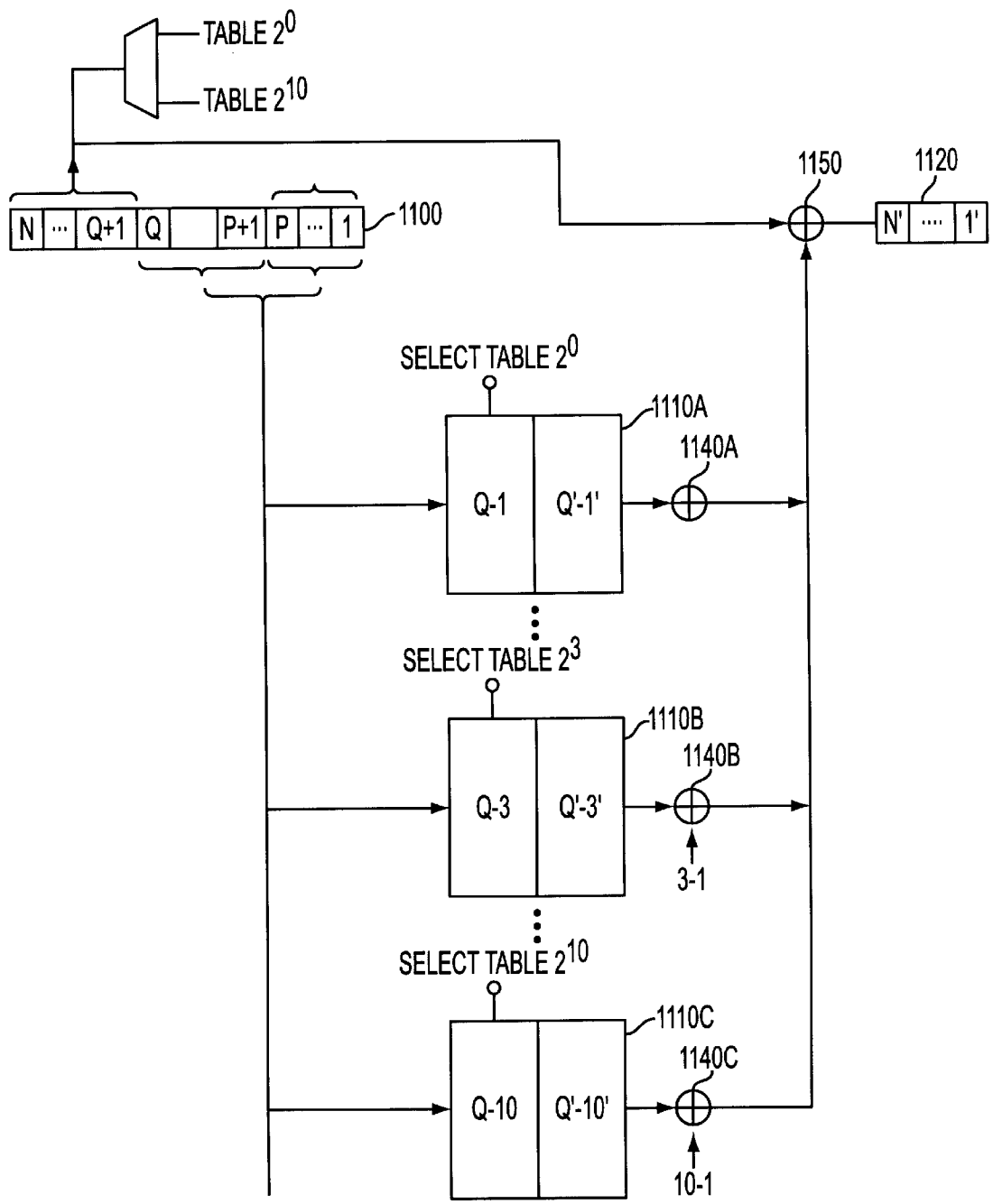
FIG. 11 is a block diagram of a different implementation of a Call Forwarding and Translation Table for managing Virtual Circuit Bunches in accordance with a second embodiment of the invention.

FIG. 11 is a block diagram of a different implementation of a Call Forwarding and Translation Table for managing Virtual Circuit Bunches in accordance with a second embodiment of the invention. As before, virtual circuit identifier, illustrated at 1100, is divided into different portions. In this case, the P least significant bits and the Q–(P+1) more (intermediate) significant bits function substantially as discussed in conjunction with FIG. 10. However, the N–(Q) most significant bits are utilized as an input to selector 1130 which, depending on the value of the N–(Q+1) bits will select a particular translation table, such as tables 1110A, 1110B and 1110C as shown in FIG. 11. These tables are respectively labelled Table $2^0$, Table $2^3$ and Table $2^{10}$. In this approach, a separate table is maintained for each virtual circuit bunch of size $2^P$ which one describes to support. It is not necessary that a table be implemented for each integer from 0–P, but it may be desirable to do so. If a virtual circuit identifier 1100 arrives which is not part of a virtual circuit bunch, then the N–(Q) high order bits will select Table $2^0$ (1110A). Table $2^0$ contains individual, that is unbunched, virtual circuit identifiers. If a virtual circuit identifier arrives which is part of a virtual circuit bunch of size 8, the first N–(Q+1) bits will indicate that Table $2^3$ (1110B) should be selected. If an incoming VCI is part of a virtual circuit bunch having a size of 1,024 virtual circuits, then the high order N–(Q) bits will indicate the Table $2^{10}$ (1110C) should be selected. Bits 1–Q of virtual circuit identifier 1100 are applied to the input side of each of the look up tables 1110A, 1110B and 1110C. Those Q bits will result in an of Q–P as p bits shown in the righthand column of each look up table. In table 1110A, where P=0, a full Q bits will be output. Those Q bits will be combined with the incoming high order N–(Q) bits forming a complete translated VCI.

If table 1110B is selected, the high order Q–3 bits are used as an input address to the table resulting in a translated Q–3 bits which are applied to combiner 1140B. The least significant bits, namely bits 3–1 from the incoming VCI are applied to the other input of combiner 1140B.

If the incoming virtual circuit identifier indicates that the virtual circuit is part of a virtual circuit bunch of size $2^{10}$, the N–(Q) bits will indicate to selector 1130 that table $2^{10}$ (1110C) should be activated, the more (intermediate) significant Q–10 bits will be utilized as an input to look up table 1110C and the output Q'–10' bits will be applied to combiner 1140C where it will be combined with the untranslated low order 10 bits from the incoming virtual circuit identifier. In each of the exemplary cases 1110A, 1110B and 1110C, the Q–P translated bits are combined with the P untranslated bits of the incoming VCI in combiners 1140A–1140C to produce the low order Q bits of the translated virtual circuit identifier. Those low order Q bits are then combined in combiner 1150 with the high order N–Q bits from the incoming VCI specifying the table to be utilized to form a translated virtual circuit identifier 1120.

Figure 12:
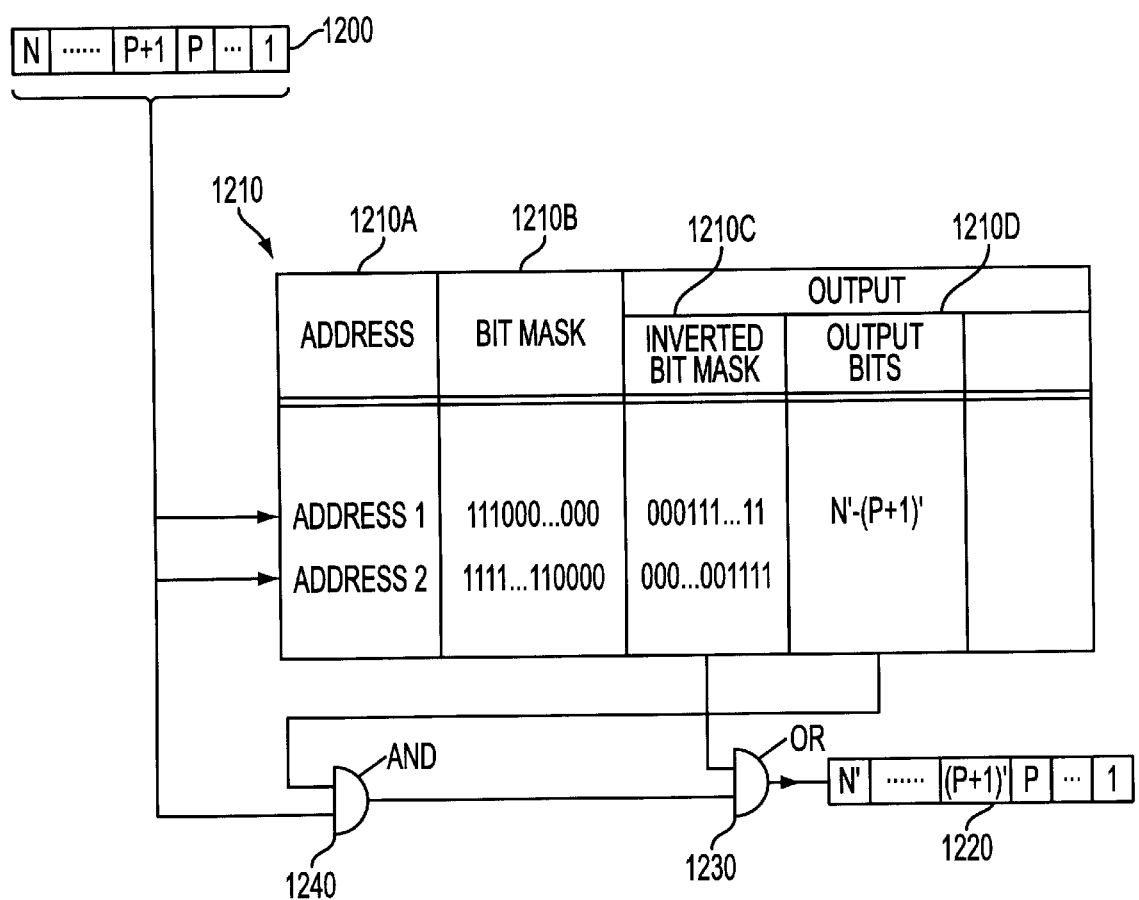
FIG. 12 is a block diagram of a different implementation of a Call Forwarding and Translation Table for managing Virtual Circuit Bunches in accordance with a third embodiment of the invention—one which uses a content addressable memory.

FIG. 12 is a block diagram of a different implementation of a Call Forwarding and Translation Table for managing Virtual Circuit Bunches in accordance with a third embodiment of the invention which uses a content addressable memory. As before, a virtual circuit identifier 1200 is received and the entire virtual circuit address is applied in parallel to a content addressable memory and compared with the addresses shown in column 1210A of the content addressable memory. A bit mask, as shown in column 1210B of the content addressable memory is applied to the incoming virtual circuit address so that only certain bits of that address are considered for purposes of matching to determine an output for the associated address. In column 1210B, the bit mask entries associated with address 1 from column 1210A indicates that the first three bits of the address will be considered and determining whether there is a match between the incoming virtual circuit identifier 1200 and address 1. If there is a match, the output bits from column 1210D are applied to combiner 1230 to produce output bits corresponding to bits N'–(P+1)' of the output VCI 1220. The inverse of bits of the bit mask found in column 1210B, are placed in the same row in column 1210C. In the examples shown, where ones indicate the bit position should be considered for a match, the last N–3 bits are taken from the original incoming VCI 1200 and are passed through combiner 1230 into output VCI 1220. In this manner, by using a bit mask and its inverse, one can determine the size of the virtual circuit bunch by determining the number of bits P which pass through to the output VCI by an entry written into the forwarding and translation table 1210. Although logic symbols here are utilized for items 1230 and 1240, each of these symbols may represent a plurality of OR gates or AND gates. Single gates are utilized when there is a clocked bit by bit comparison whereas plural AND gates or OR gates may be utilized when bits are read from a register in parallel. Thus, these implementations can be implemented in either bit serial or bit parallel modes.

Although FIGS. 10, 11 and 13 are shown as implemented in hardware, it is clear that it is elementary to implement this type of arrangement in software as well. Preferably, however, the table entries are implemented in hardware because of the need for high speed routing of packets through the switch fabric. The modes of FIGS. 11 and 12 are preferred and the selection between the implementations of FIG. 11 and FIG. 12 being made on cost and performance evaluation of the various commercial hardware products available for implementing these circuits.

Although the example as shown have utilized virtual circuit bunches with boundaries on a $2_R$ boundary, when this is not the case, more than a single table entry may be used. Thus, for example, when a 12 VCI bunch (e.g. VCI=800—VCI=811) it may be broken into two parts, each for the corresponding table entry. For example, VCIs 800–807 might be part of a single table entry describing an 8 VCI bunch and VCI 808–811 might be part of a 4 VCI bunch.

FIG. 13 is an exemplary controller table storing VCB information. This one is located at switch 1. At switch 1, VCB 3 is defined as a set of <port, VCI> tuples listed in the right hand column of the table together with the destination for those <port, VCI> tuples. The entire set of 25 VCBs may be referred to by the convenient alias VCB 3. Alternatively, subsets of VCB 3 can be referred to by the convenient aliases VCB 3A, VCB 3B, and VCB 3C, each having a respective destination. Thus, a hierarchy of aliases, which may number more than the two levels shown, maybe utilized to conveniently refer to portions of a group a virtual circuits preestablished in a virtual circuit bunch.

FIG. 14 shows exemplary tables in a switch controller storing connection information relating to a VCB used at a node at either end of a virtual circuit bunch. Different tables are utilized at intermediate nodes. These tables are utilized by the switch controller to establish switching table values for controlling the switching fabric to route an incoming port and VCI to its appropriate outgoing port and VCI. As shown in FIG. 14, different tables are utilized for the forward and reverse direction. Referring to the table shown in FIG. 8B, table 1400 which is for the forward direction differs from table 1420 for the reverse direction. For purposes of explanation, these tables do not show the VCB techniques described in conjunction with FIGS. 8C and 10–12. Each of these table entries only shows the <port, VCI> tuples associated with the virtual circuit bunch although other entries are present. As shown in column 1 of FIG. 8B, virtual circuits 102–109 from port 3 have requested connections to destination node switch 4. Thus they are assigned a virtual circuit identifier, in column 1440 of FIG. 14, VCB 3A. The specific output <port, VCI> tuples to be utilized for these virtual circuits is any unused VCI on outgoing port 5 in the VCB 3A. Similarly, the other lists of input <port, VCI> tuples and virtual circuits found in column 1430 of table 1400 have an alias identifier of the virtual circuit bunch to which they have been assigned for routing data to the destination serviced by the respective virtual circuit bunch.

The reverse direction is specified in table 1420.

Since any <port, VCI> tuple associated with VCB 3 may route to any destination on switch 1 the destination address for the cell is read and the corresponding <port, VCI> specified for the destination is utilized to control the switching fabric so that data incoming on VCB 3 is routed to the correct destination.

Considering these tables in more detail, when table 1400 is utilized and the VCI is listed as a virtual 10 circuit bunch alias, the definition of the virtual circuit bunch is looked up in the table described in FIG. 13, selection of an unused <port, VCI> tuple in the virtual circuit bunch is made and an unused <port, VCI> tuple is written into the forward and reverse switch tables to set up a virtual circuit connection.

Figure 15:
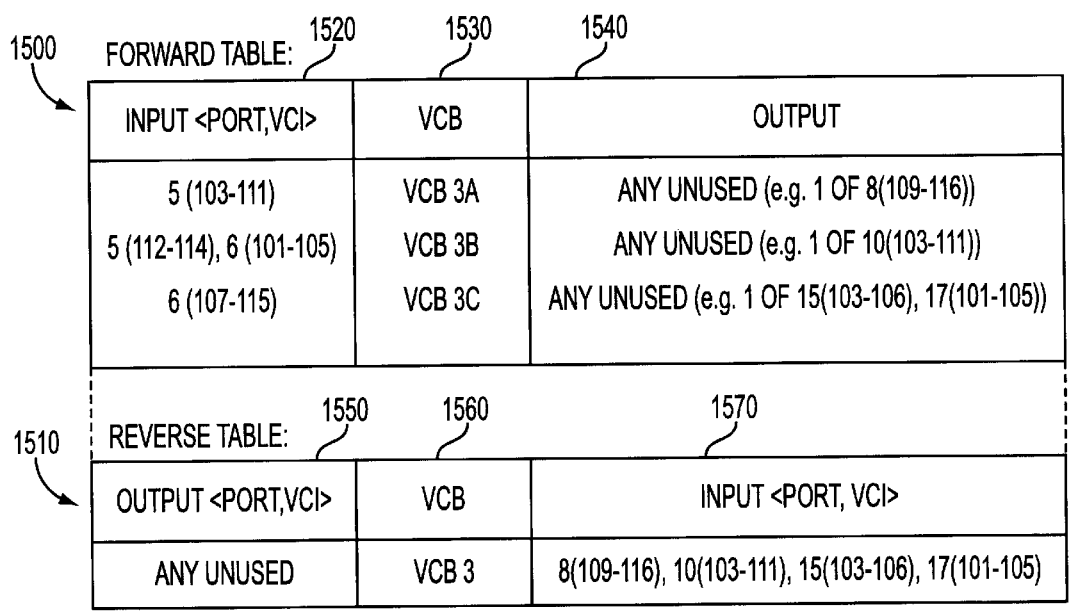
FIG. 15 shows exemplary tables storing connection information relating to a VCB at a node intermediate to the end nodes of a VCB.

FIG. 15 shows exemplary tables storing connection information relating to a VCB at a node intermediate to the end nodes of a VCB. This table is one typically found in an intermediate switch, such as switch 2 shown in FIG. 9. Table 1500 shown in FIG. 15 is very similar table 1400 shown in FIG. 14.

Note that table 1500 shown in FIG. 15 contains many fewer entries than would be required if each virtual circuit were set up separately without the benefit of virtual circuit bunches. Table 1510 shows an even greater conciseness of expression. A single entry is sufficient to specify the reverse direction for all 25 virtual circuits in the virtual circuit bunch. In the reverse table, data incoming on any of the listed virtual circuits would be routed to VCB 3 and will be assigned to any unused virtual circuit in VCB 3 for transmission to switch 1. Again to determine the unused output <port, VCI> tuple in VCB 3, one could refer to the table, such is shown in FIG. 13 at switch 2 and then check occupancy data for the virtual circuits participating in VCB 3.

Figure 16:
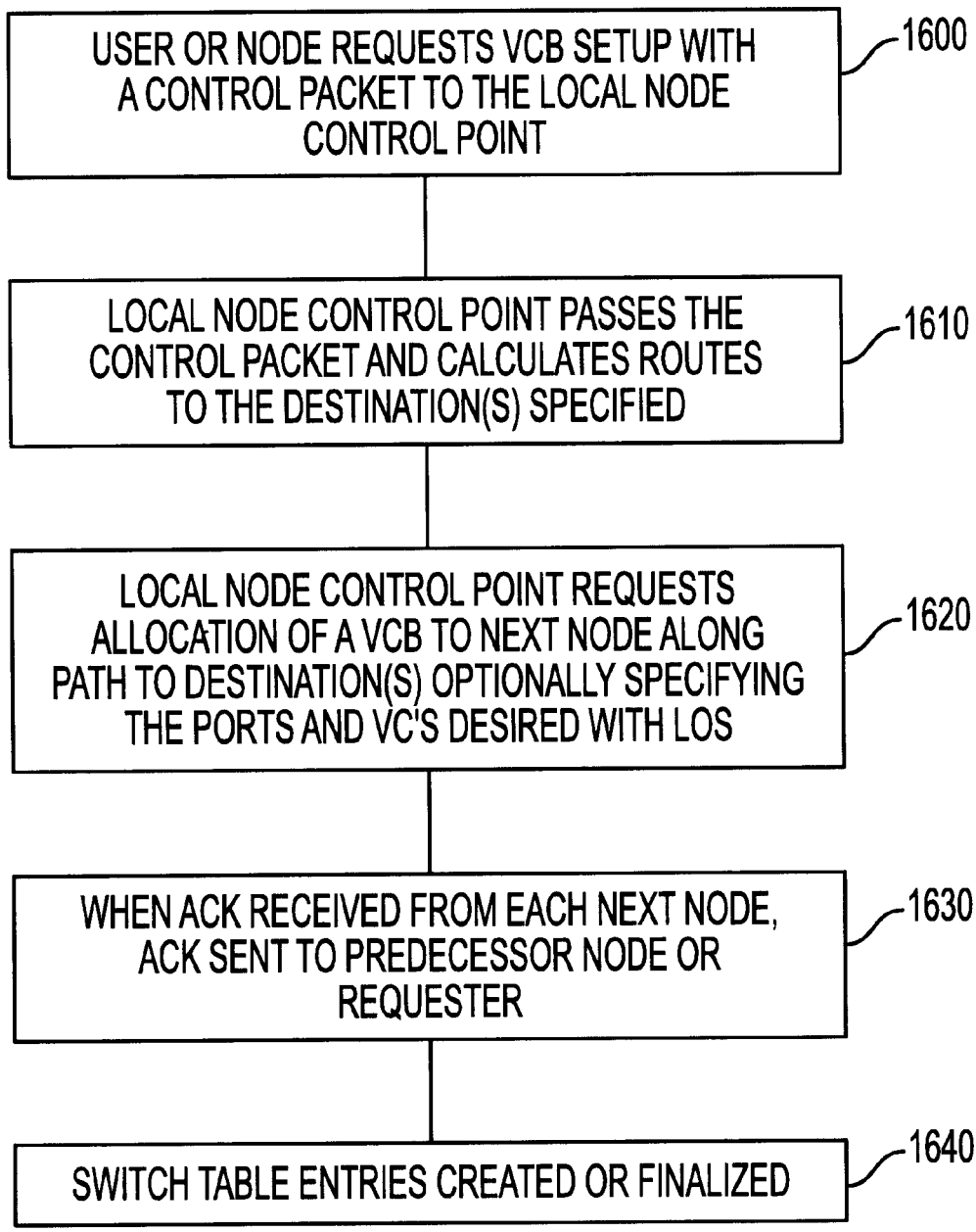
FIG. 16 is a flow chart of a process for setting up a VCB in accordance with the invention.

FIG. 16 is flow chart of a process for setting up a VCB in accordance with the invention. The process begins when a user or node requests a VCB setup with a control packet to the local node control point (1600). The local node control point parses the control packet and calculates routes to the destination(s) specified (1610). This may be either a complete route calculation or a best next node calculation. The controller identifies outgoing virtual circuits needed to satisfy the contract for the level of service needed for the connections requests to each destination and then requests allocation of a virtual circuit bunch to the next node along with path, actually specifying the VCs desired (1620).

When an acknowledgment is received from the next node, an acknowledgment is sent either to the predecessor node or the requesting station 1630 and table entries are created or finalized (1640) thus setting up the virtual circuit.

Figure 17:
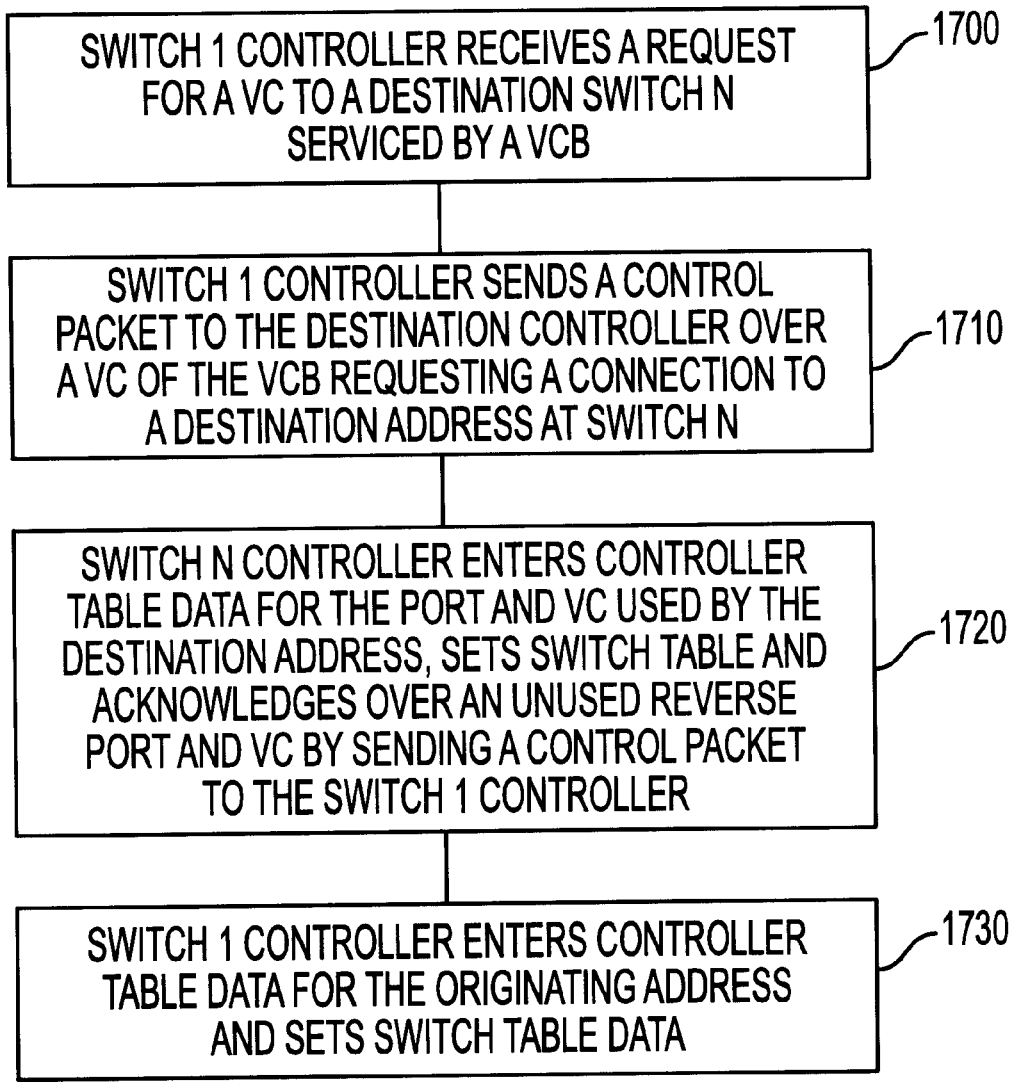
FIG. 17 is a flow chart of a process for setting up a VC over an established VCB in accordance with the invention.

FIG. 17 is a flow chart of a process for setting up a virtual circuit using an established virtual circuit bunch in accordance with the invention. Continuing with the previous example, the switch 1 controller receives a request for a VC to a destination switch N serviced by the VCB (1700). The switch 1 controller sends a control packet to the switch N controller either over a VC of the VCB or over a control link (1710) requesting a connection to a destination address at switch N. The switch N controller enters controller table data for the <port, VCI> tuple to be used by the destination address, sets the switch table and acknowledges the connection by sending a control packet to the switch 1 controller (1720). The switch 1 controller enters the controller table data for the destination address and the originating address and sets the switch table entries (1730), thus establishing an end to end connection between user 1 and user 2. Thus, in contrast to the process described in conjunction with FIGS. 4 and 5, since a virtual circuit bunch has already been set up, the only action required to establish an end to end connection is at the end points of the virtual circuit bunch. Thus, the switch 1 controller needs only establish a connection between the requesting virtual circuit for user U1 and the virtual circuit bunch destined for switch N, and switch N needs only to establish an association between the virtual circuit bunch and the destination user U2. Thus network traffic is significantly reduced, processing at the intermediate nodes is eliminated since the virtual circuit bunch has already been set up.

Figure 18:
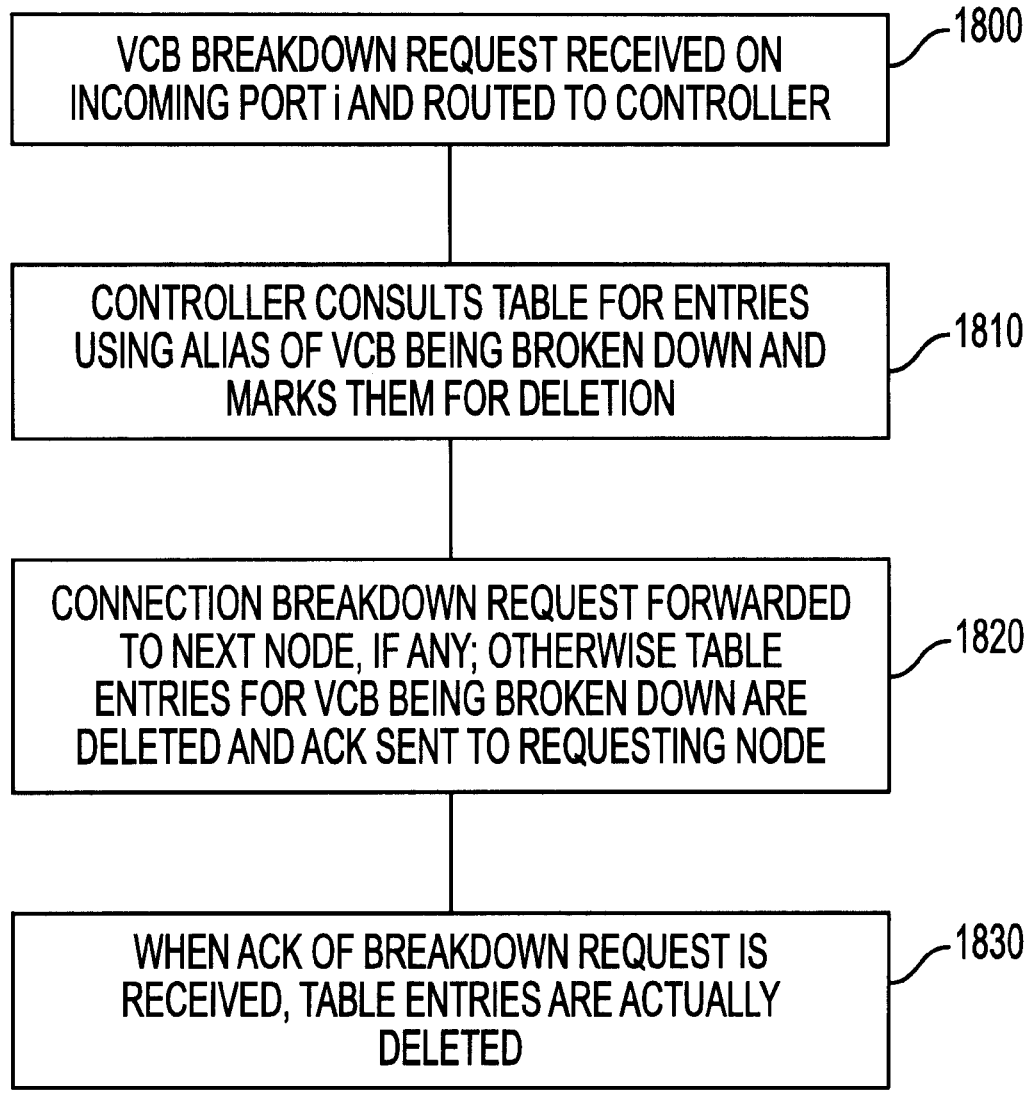
FIG. 18 is a flow chart of a process for breaking down a VCB in accordance with the invention.

FIG. 18 is a flow chart of a process for breaking down a virtual circuit bunch in accordance with the invention. A virtual circuit bunch breakdown request is received on an incoming port i and routed to the controller (1800). The controller consults the table for entries using aliases of the VCB being broken down and marks them for deletion (1810). The connection breakdown request is forward to the next node, if any; otherwise table entries for the VCB being broken down are deleted and acknowledgment is sent to the requesting node (1820). When acknowledgment of a breakdown requests is received, table entries have been actually deleted and all traces of the virtual circuit bunch are eliminated from the system (1830).

Figure 19:
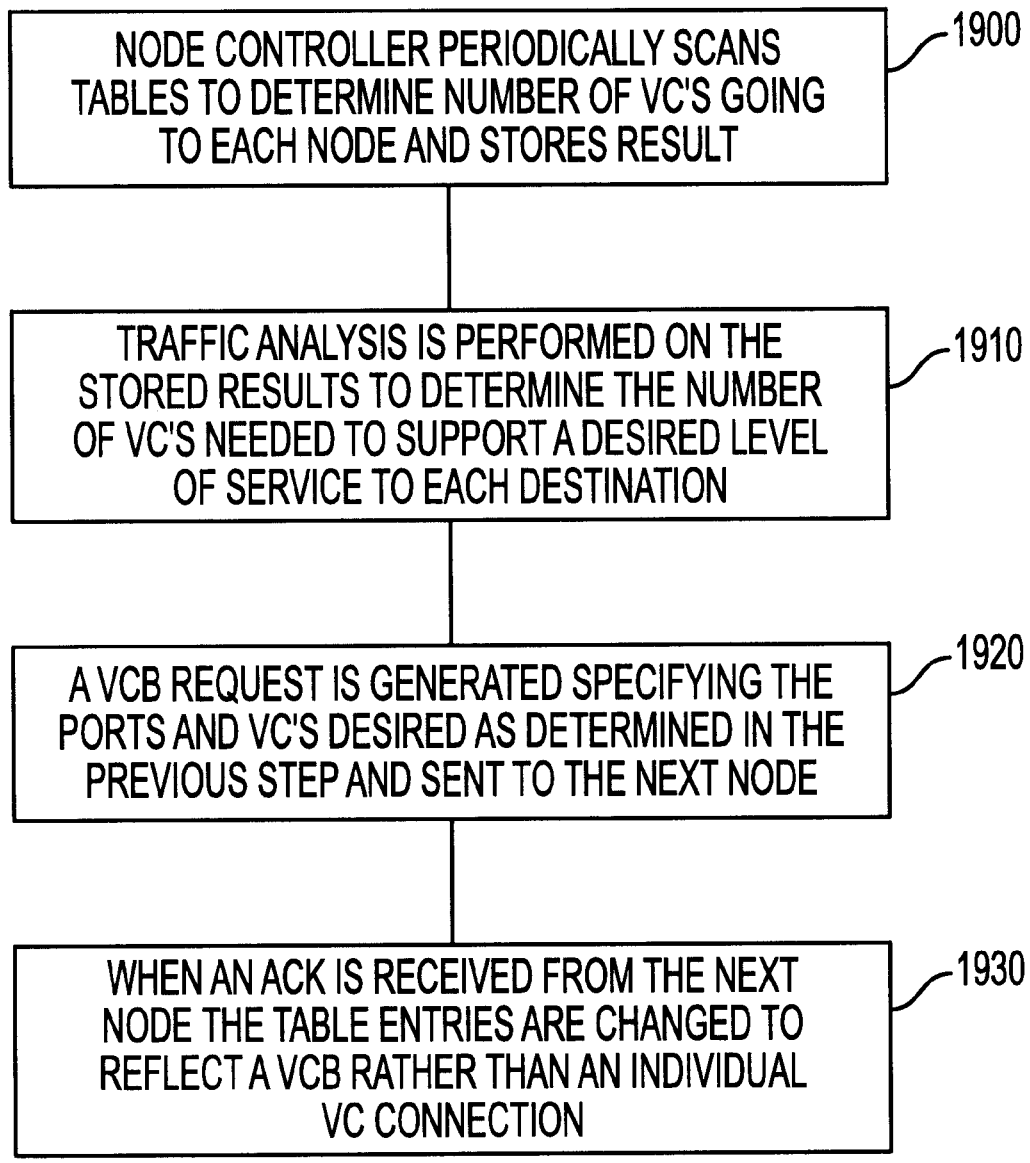
FIG. 19 is a flow chart of a process for aggregating virtual circuits into a VCB in accordance with the invention.

FIG. 19 is a flow chart for a process for aggregating virtual circuits into a VCB in accordance with the invention. The node controller will periodically scan switched tables to determine the number of virtual circuits going to each node and store the results (1900). Traffic analysis as performed on the starred results to determine the number of virtual circuits needed to support a desired level of service to each destination (1910). When the traffic analysis indicates that a particular number of virtual circuits is desired between the node doing the analysis and a destination node, a VCB request is generated specifying the ports and VCs desired and sent to the next node (1920). When an acknowledgement is received from the next node, the table entries are changed to reflect that the connections are part of a virtual circuit bunch rather than an individual virtual circuit connection (1930).

Figure 20:
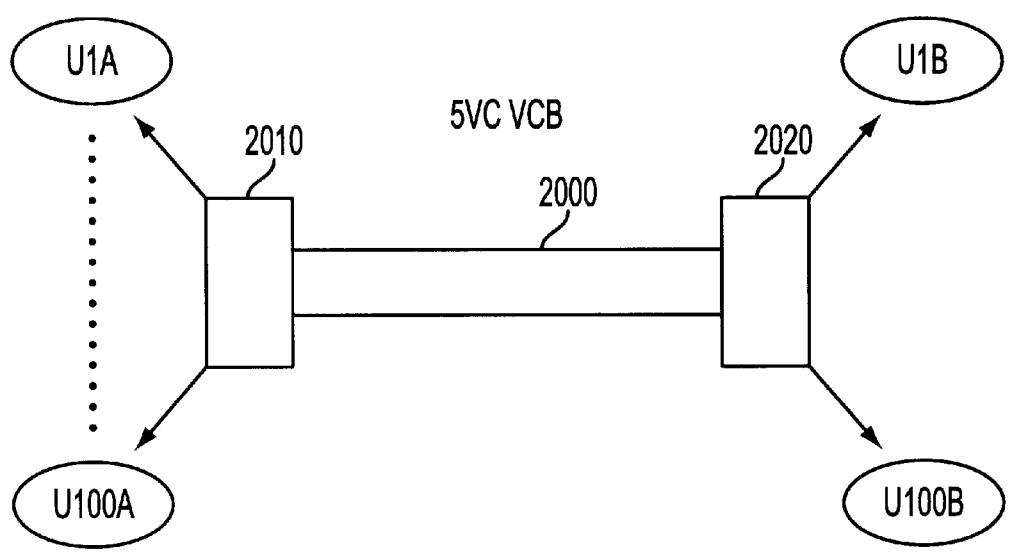
FIG. 20 is a block diagram illustrating statistically sharing virtual circuits of a VCB for a fast connect service.

FIG. 20 is a block diagram illustrating sharing of virtual circuits of a virtual circuit bunch for a fast connect service. For purposes of this illustration assume that users U1A through U100A generate messages of short duration. A five circuit bunch VCB 2000 is shown going between the node servicing users U1A through U100A and the node servicing users U1B through U100B. Block 2010 shows a distribution mechanism which will assign the short duration message from users U1A through U100A to the five virtual circuits of the VC bunch 2000 according to a distribution policy that may be partially deterministic, random, or pseudo-random. In any case, at the destination end, 2020, the destination addresses of the cells are read and the cells routed to the destination address without a formal virtual circuit being setup. In short, when one of users U1A through U100A has a message to send, it is assigned to one of the virtual circuits of virtual circuit bunch according to the distribution policy without actually setting up a connection and it is routed at the receiving end to the destination, also without setting up a connection. Thus, the five virtual circuits of the virtual circuit bunch can service a much larger number of users without a need for a separate on the fly connection establishment. This provides a very quick and efficient fast connect service.

Figure 21:
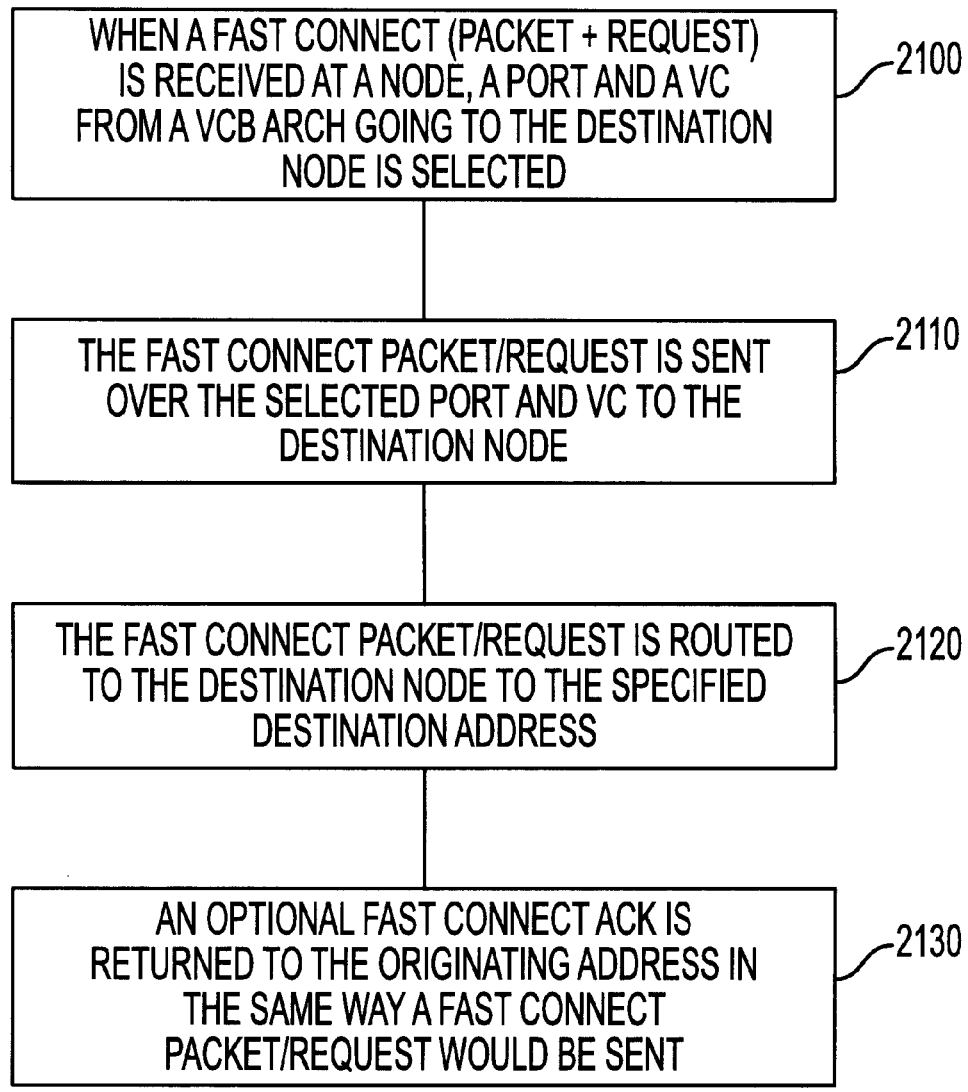
FIG. 21 is a flow chart of a process used for providing a fast connect service.

FIG. 21 is a flow chart of the process described in conjunction with FIG. 20. When a fast connect packet plus request is received at a node, a <port, VCI> tuple from a VCB going to the destination node is selected (2100). The fast connect packet/request is sent over the selected <port, VCI> tuple to the destination node (2110). The fast connect packet/request is routed at the destination node to the specified address (2120) and an optional fast connect acknowledgment is returned to the originating address in the same way fast connect packet/request was sent (2130).

Figure 22:
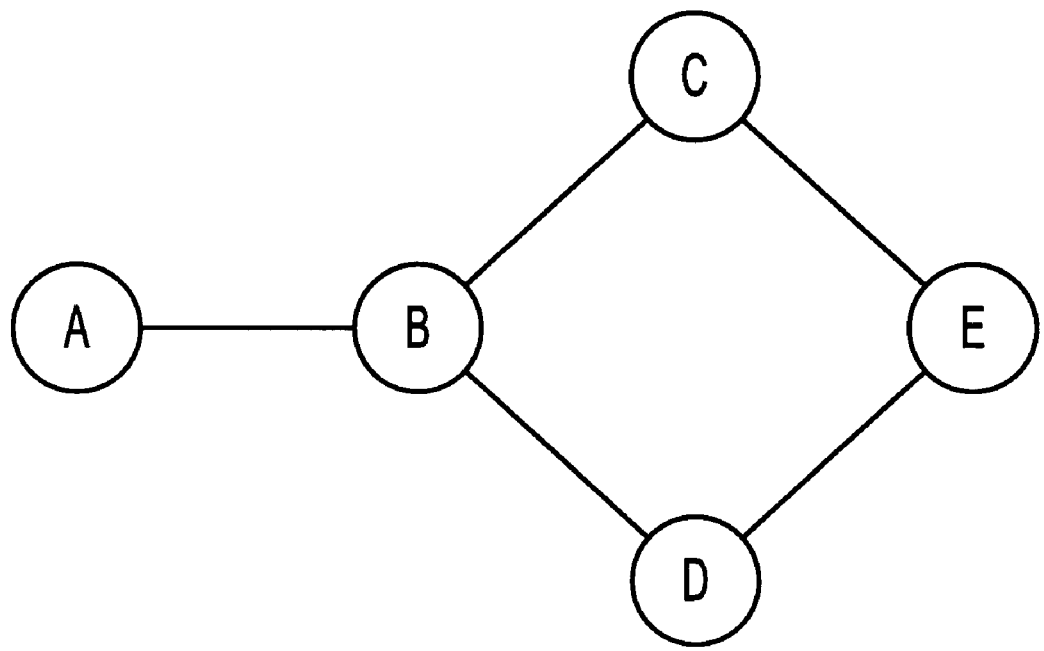
FIG. 22 is a block diagram of a portion of a network used to illustrate split routing of a VCB.

FIG. 22 is a block diagram of a portion of a network used to illustrate split routing of a VCB. Assume that node A requests 150 virtual circuits to destination E at a given level of service (LOS). Only 100 such virtual circuits are available through C and node D has only 85 available. This decision may also be the result of a policy decision (for example, load-balancing) of the network control system. Node B can allocate a virtual circuit bunch routing a portion of the VCB over a node C and the remainder over node D. This kind of split routing was not a capability provided by the virtual path technology of the prior art. Thus VCBs can split the routing of a virtual circuit bunch into convenient units.

The same figure illustrates another benefit achieved by the invention. In the prior art, there is sometimes a need to send keep alive packets or refresh packets periodically over each virtual circuit to avoid a connection timing out and being broken down. With a virtual circuit bunch, one only needs to send one keep alive packet or refresh packet per virtual circuit bunch and not one for each circuit. This reduces network traffic and processing power requirement.

Figure 23:
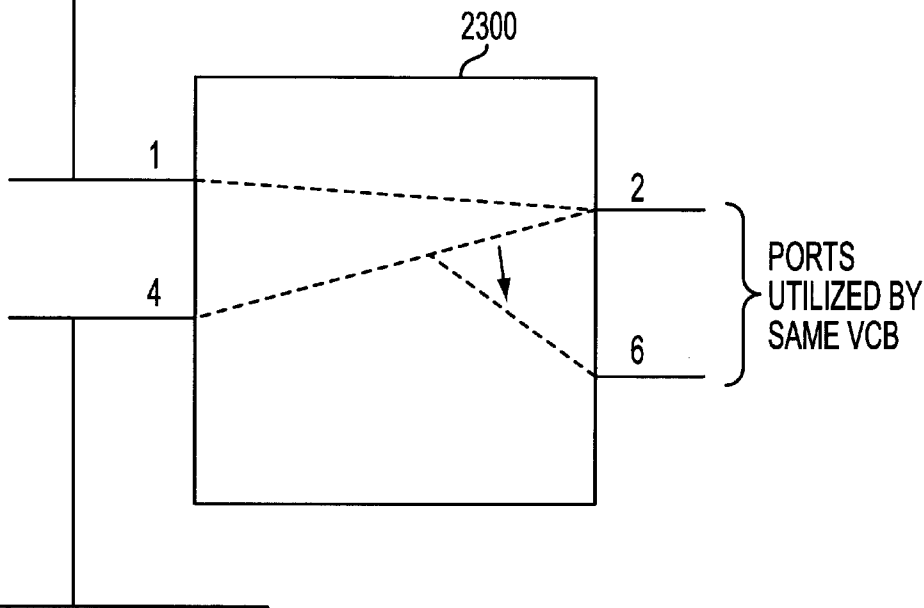
FIG. 23 is a block diagram showing use of a VCB when multi-casting over a network.

FIG. 23 is a block diagram showing the cell interleaving problem and how it is solved when using a virtual circuit bunch. The problem arises when, as shown in FIG. 20, two <port, VCI> tuples attempt to send to the same destination. Thus, the port 1 switch table (2310) attempts to route VCI 120 to port 2, VCI 150. Similarly, as shown in table 2320, port 4 attempts to route VCI 125 to outgoing port 2 and VCI 150. Thus, cells from two sources would occur on the same outgoing port and VCI and would result in a error condition at the destination. Such a failure will be detected when the CRC result will not conform to the expected result. If outgoing ports 2 and 6 were part of the same virtual circuit bunch, one of the two conflicting connections could be routed over another unused VCI of the virtual circuit bunch or over an unused VCI of port 2. Alternatively, some of the virtual circuits could be used to permit sharing by appropriate selection as discussed above. Thus, when cell interleaving occurs, rerouting can be easily accomplished using a virtual circuit bunch and cells successfully routed to the correct destination without error.

The previous examples illustrated VC bunching is somewhat static manner—the bunches were established as a unit, and they remained the same through the life-time. However, VC bunches can also be established and modified dynamically. The system may decide that a set of already established VCs (and bunches) can be served more efficiently by aggregating them together into a large bunch. Alternately, when a new VC (or bunch) establishment request arrives, the switch may decide to incorporate it into an existing bunch (by expanding it). Such dynamic aggregation may require changes in VC identifiers.

Figure 24A:
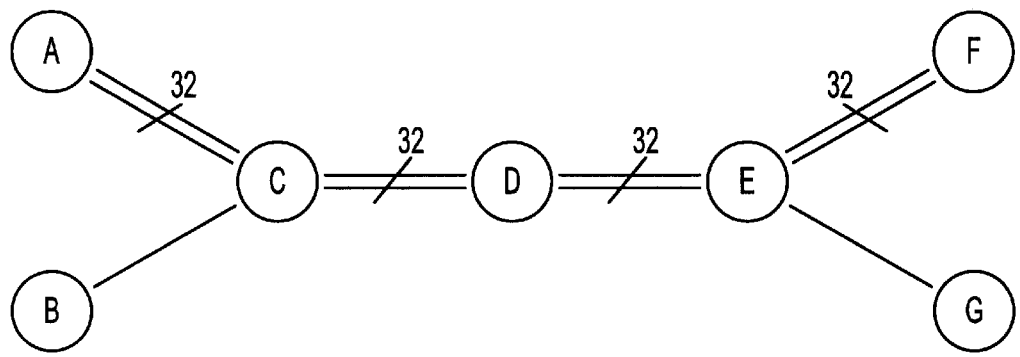
FIGS. 24A and 24B show a block diagram showing use of a VCB when multi-casting using plural sources over a network.
Figure 24B:
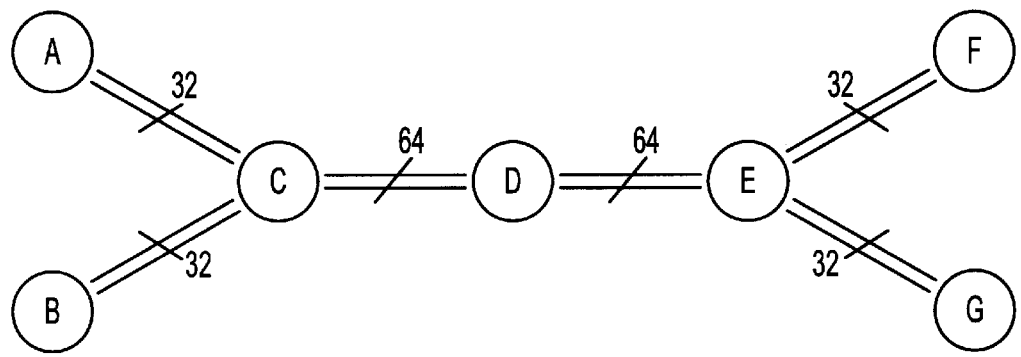

FIG. 24A illustrates this concept; initially, the switches A, C, D, E and F carry a bunch of size 32. Now, node B wants to set up a bunch of size 32 to node G. When the new bunch request arrives at node C (from node B), node C aligns the new VC bunch with the existing bunch, to create a size 64 bunch at entry to node D as shown in FIG. 24B which sets up the expanded bunch of 64 to node E, where the two bunches are separated once again (as the paths diverge). In this manner, one can dynamically create flexible bunches via aggregation.

The invention disclosed provides improved efficiency for setting up multiple connections in a network environment. It results in a reduction in the virtual circuit table size. It maintains compatibility with current switches without requiring hardware changes to participate in the VC bunching. However, if hardware changes are made, table entries are further reduced and performance further improved. It permits use in multi-path virtual circuit bunches which was not feasible in the case of virtual paths. It supports aggregation by which data paths may start out as individual circuits but later the neighbors may agree to change identifiers so as utilize VC bunching. It provides efficient support for sharing resource allocations. It supports a variety of techniques for handling ATM cell interleaving problems, particularly in multi-sender multi-cast. It provides efficient support for fast connection set up and for a fast connect service. It provides considerable efficiency for handling keep-alive and refresh packets. It does not require a full $2^{16}$ address space required by virtual paths. Only the address space required for a particular virtual circuit bunch is set up. It allows virtual circuit bunches to be subdivided to service multiple destinations. Once a virtual circuit bunch is set up essentially zero latency is required for set up of a virtual circuit from the origin to the destination. With virtual circuit paths, once the large address space was allocated, resources were assigned and dedicated to it. Those resources were not used, the resources were wasted. Virtual circuit bunches permit allocation of resources on an as needed basis.

By using the approaches shown in FIGS. 10, 11 and 12, one can manage virtual circuit bunches with a single table entry and, if implemented in hardware, with improved performance.

Thus, the techniques of the invention described overcome the problems of the prior art and permit great flexibility in the establishment and use of virtual circuits.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital switch, comprising:
   a. a control element; and
   b. a switching element, said switching element comprising a forwarding table configured to forward virtual circuits of a virtual circuit bunch with a single table entry.

2. The digital switch of claim 1 in which said forwarding table comprises a look up table which translates only part of a incoming virtual circuit identifier.

3. The digital switch of claim 2 in which part of said incoming virtual circuit identifier is combined with the output of said look up table.

4. The digital switch of claim 1 in which said forwarding table comprises a plurality of look up tables, each accommodating virtual circuit bunches of a respective predetermined size.

5. The digital switch of claim 4 in which one of said plurality of look up tables is selected by one or more bits of a virtual circuit identifier.

6. The digital switch of claim 5 in which the output of said plurality of look up tables is combined with a plurality of other bits of said virtual circuit identifier.

7. The digital switch of claim 1 in which said forwarding table comprises a content addressable memory.

8. The digital switch of claim 7 in which said content addressable memory is accessed by a virtual circuit identifier, and the bits of the virtual circuit identifier used to access the content addressable memory are set by a bit mask.

9. The digital switch of claim 8 in which bits not used to access the content addressable memory are combined with the output of the content addressable memory.

10. A digital switch, comprising:
    a. a control element; and
    b. a switching element, said switching element comprising a forwarding table configured to forward virtual circuits of a virtual circuit bunch with a single table entry in which:
       said forwarding table comprises a content addressable memory;
       said content addressable memory is accessed by a virtual circuit identifier, and the bits of the virtual circuit identifier used to access the content addressable memory are set by a bit mask;
    bits not used to access the content addressable memory are combined with the output of the content addressable memory; and
    said bits not used are specified by an inverted version of said bit mask.

11. The digital switch of claim 1 including one or more additional table entries, cooperating with a first table entry to forward virtual circuits of a single virtual circuit bunch.

12. A method of controlling a switching element, comprising the steps of:
    a. providing a plurality of elements each for performing the step of translating a respective portion of an incoming identifier; and
    b. providing an element for performing the step of combining a translated portion of said identifier with a non-translated portion of said identifier to produce a control signal for said switching element.

13. A method of controlling a switching element, comprising the steps of:
    a. providing an element each for performing the step of translating a respective portion of an incoming identifier specified by a bit mask; and
    b. providing an element for performing the step of combining a translated portion of said identifier with a non-translated portion of said identifier to produce a control signal for said switching element.

14. A method of controlling a switching element, comprising the steps of:
    a. providing an element each for performing the step of translating a respective portion of an incoming identifier specified by a bit mask; and
    b. providing an element for performing the step of combining a translated portion of said identifier with a non-translated portion of said identifier to produce a control signal for said switching element, in which said non-translated portion is selected using an inverse of said bit mask.

15. A digital network, comprising
    a plurality of digital switches in which
    at least one digital switch has a control element and a switching element, and said switching element comprising a forwarding table configured to forward virtual circuits of a virtual circuit bunch with a single table entry.

16. The network of claim 15 in which said forwarding table comprises a look up table which translates only part of a incoming identifier.

17. The digital switch of claim 15 in which said forwarding table comprises a plurality of look up tables, each accommodating virtual circuit bunches of a respective predetermined size.

18. The digital switch of claim 15 in which said forwarding table comprises a content addressable memory.

19. A computer program product, comprising:

a. a memory medium; and b. a computer program, said program comprising instructions for generating a plurality of elements each translating a respective portion of an incoming identifier; and for combining a translated portion of said identifier with a non-translated portion of said identifier to produce a control signal for a switching element.

20. A computer program product, comprising:

a. a memory medium; and b. a computer program, said program comprising instructions for translating a respective portion of an incoming identifier specified by a bit mask; and for combining a translated portion of said identifier with a non-translated portion of said identifier to produce a control signal for a switching element.

* * * * *